United States Patent
Ogawa et al.

(10) Patent No.: US 9,193,906 B2
(45) Date of Patent: *Nov. 24, 2015

(54) LIQUID CRYSTAL DISPLAY DEVICE

(71) Applicant: DIC Corporation, Tokyo (JP)

(72) Inventors: Shinji Ogawa, Kita-adachi-gun (JP); Yoshinori Iwashita, Kita-adachi-gun (JP); Akira Kimura, Kamisu (JP); Seiji Funakura, Kamisu (JP); Katsunori Shimada, Sakura (JP)

(73) Assignee: DIC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/344,823

(22) PCT Filed: Oct. 3, 2012

(86) PCT No.: PCT/JP2012/075660
§ 371 (c)(1),
(2) Date: Mar. 13, 2014

(87) PCT Pub. No.: WO2014/054133
PCT Pub. Date: Apr. 10, 2014

(65) Prior Publication Data
US 2015/0042930 A1    Feb. 12, 2015

(51) Int. Cl.
*C09K 19/30* (2006.01)
*C09K 19/44* (2006.01)
(Continued)

(52) U.S. Cl.
CPC .............. *C09K 19/3003* (2013.01); *C09K 19/44* (2013.01); *G02B 5/20* (2013.01);
(Continued)

(58) Field of Classification Search
CPC .............. C09K 19/3003; C09K 19/44; C09K 2019/122; C09K 2019/123; C09K 2019/3004; C09K 2019/3009; C09K 2019/301; C09K 2019/3016; C09K 2019/526; G02F 1/133512; G02F 1/133514; G02F 1/1343; G02B 5/20
USPC .................. 349/104, 106, 108, 167, 182, 183; 252/299.01, 299.6
See application file for complete search history.

(56) References Cited

U.S. PATENT DOCUMENTS 8,269,921 B2 * 9/2012 Ohkuma et al. ................ 349/70
8,389,073 B2 * 3/2013 Hirata et al. ................... 428/1.1
(Continued)

FOREIGN PATENT DOCUMENTS

| EP | 1 369 712 A1 | 12/2003 |
|---|---|---|
| JP | 2000-019321 A | 1/2000 |

(Continued)

OTHER PUBLICATIONS

International Search Report, dated Nov. 21, 2012, issued in corresponding application No. PCT/JP2012/075660.
(Continued)

*Primary Examiner* — Geraldina Visconti
(74) *Attorney, Agent, or Firm* — Westerman, Hattori, Daniels & Adrian, LLP

(57) ABSTRACT

The present invention provides a liquid crystal display device that prevents a decrease in voltage holding ratio (VHR) and an increase in ion density (ID) in a liquid crystal layer and resolves the problems of display defects such as white streaks, alignment nonuniformity, and image sticking. Since the liquid crystal display device of the present invention prevents a decrease in voltage holding ratio (VHR) and an increase in ion density (ID) in the liquid crystal layer and resolves the problems of display defects such as image sticking, the liquid crystal display device is useful as VA-mode and PSVA-mode liquid crystal display devices of an active matrix drive type, and is applicable to liquid crystal display devices of liquid crystal televisions, monitors, cellular phones, smart phones, etc.

16 Claims, 1 Drawing Sheet

(51) Int. Cl.
  *G02B 5/20* (2006.01)
  *G02F 1/1335* (2006.01)
  *G02F 1/1343* (2006.01)
  *C09K 19/12* (2006.01)
  *C09K 19/52* (2006.01)

(52) U.S. Cl.
  CPC ....... *G02F 1/1343* (2013.01); *G02F 1/133512* (2013.01); *C09K 2019/122* (2013.01); *C09K 2019/123* (2013.01); *C09K 2019/301* (2013.01); *C09K 2019/3004* (2013.01); *C09K 2019/3009* (2013.01); *C09K 2019/3016* (2013.01); *C09K 2019/523* (2013.01); *G02F 1/133514* (2013.01)

(56) References Cited

U.S. PATENT DOCUMENTS

| 2010/0271569 | A1 | 10/2010 | Ohkuma et al. |
| 2011/0297881 | A1 | 12/2011 | Hirata et al. |
| 2012/0229744 | A1 | 9/2012 | Hattori et al. |

FOREIGN PATENT DOCUMENTS

| JP | 2000-192040 A | 7/2000 |
| JP | 2002-309255 A | 10/2002 |
| JP | 2009-109542 A | 5/2009 |
| JP | 2009-163014 A | 7/2009 |
| JP | 2010-256509 A | 11/2010 |
| TW | 201031735 A1 | 9/2010 |
| TW | 201224065 A1 | 6/2012 |
| TW | 201229574 A1 | 7/2012 |
| TW | 201239071 A1 | 10/2012 |
| WO | 2010/095506 A1 | 8/2010 |
| WO | 2011/092973 A1 | 8/2011 |

OTHER PUBLICATIONS

Supplementary European Search Report dated Dec. 1, 2014, issued in European Patent Application No. 12876587 (2 pages).

* cited by examiner

LIQUID CRYSTAL DISPLAY DEVICE

TECHNICAL FIELD

The present invention relates to liquid crystal display devices.

BACKGROUND ART

Liquid crystal display devices have come to be used in watches, calculators, various home electric appliances, measuring instruments, automobile panels, word processors, electronic organizers, printers, computers, and televisions. Representative examples of liquid crystal display modes include TN (twisted nematic) mode, STN (super twisted nematic) mode, DS (dynamic scattering) mode, GH (guest host) mode, IPS (in-plane switching) mode, OCB (optically compensated birefringence) mode, ECB (electrically controlled birefringence) mode, VA (vertical alignment) mode, CSH (color super homeotropic) mode, and FLC (ferroelectric liquid crystal). The drive mode shifted from static driving to multiplex driving. The mainstream technology is a simple matrix mode and recently an active matrix (AM) mode in which devices are driven with TFTs (thin film transistors) and TFDs (thin film diodes), for example.

Referring to FIG. 1, a typical liquid crystal display device includes two substrates (1) each having an alignment film (4), a transparent electrode layer (3a) serving as a common electrode and a color filter (2) which are disposed between one of the substrates and the alignment film of the one substrate, and a pixel electrode layer (3b) between the other substrate and the alignment film of that other substrate. The substrates are arranged so that the alignment films face each other and a liquid crystal layer (5) is held between the alignment films.

The color filter layer is constituted by a color filter that includes a black matrix, a red color layer (R), a green color layer (G), a blue color layer (B), and, if needed, a yellow color layer (Y).

Liquid crystal materials constituting such liquid crystal layers have been subjected to high levels of impurity control since impurities remaining in the materials significantly affect electrical properties of display devices. Regarding the materials that form alignment films, it has been known that impurities remaining in alignment films migrate to the liquid crystal layer as the alignment films come into direct contact with the liquid crystal layer. Studies are now being made in order to determine the properties of liquid crystal display devices affected by the impurities in the alignment film materials.

Materials, such as organic pigments, used in the color filter layer are also presumed to affect the liquid crystal layer due to impurities contained in the materials as with the case of the alignment film materials. However, since an alignment film and a transparent electrode are interposed between the color filter layer and the liquid crystal layer, the direct effects on the liquid crystal layer have been considered to be significantly low compared to those of the alignment film materials. However, alignment films are usually as thin as 0.1 μm or less in thickness. Transparent electrodes that serve as color-filter-layer-side common electrodes are thick so as to enhance the electrical conductivity; however, the thickness thereof is only as large as 0.5 μm or less. Accordingly, the color filter layer and the liquid crystal layer are not completely separated from each other. There is a possibility that impurities contained in the color filter layer may migrate through the alignment film and the transparent electrode and cause a decrease in voltage holding ratio (VHR) and an increase in ion density (ID) in the liquid crystal layer, thereby leading to display defects such as white streaks, alignment nonuniformity, and image sticking. Studies have been made to find a way to resolve display defects caused by impurities contained in pigments in color filters. For example, a method of controlling elution of impurities into liquid crystals by using a pigment in which the content of extracts obtained with ethyl formate is limited to a particular value or less (PTL 1) and a method of controlling elution of impurities into liquid crystals by specifying the pigment in the blue color layer (PTL 2) have been studied. However, these methods do not differ much from simply decreasing the amounts of impurities in the pigment and fail to provide sufficient improvements that resolve the display defects especially considering the recent progress in pigment purification technologies.

Also disclosed are a method that focuses on the relationship between organic impurities contained in the color filter and a liquid crystal composition, in which insolubility of the organic impurities in the liquid crystal layer is indicated by a hydrophobicity parameter of liquid crystal molecules contained in the liquid crystal layer and the value of this hydrophobicity parameter is controlled to a particular value or higher and a method of preparing a liquid crystal composition that contains a particular fraction or more of a liquid crystal compound having terminal —$OCF_3$ groups since there is a correlation between this hydrophobicity parameter and the —$OCF_3$ groups at termini of liquid crystal molecules (PTL 3).

However, the essence of the invention disclosed in this literature is to suppress effects of impurities in the pigment on the liquid crystal layer and thus a direct relationship between the structure of the liquid crystal material and the structure of the coloring material such as dyes and pigments used in the color filter has not been investigated. This literature does not resolve the problems related to display defects of liquid crystal display devices that have become increasingly complicated.

CITATION LIST

Patent Literature

PTL 1: Japanese Unexamined Patent Application Publication No. 2000-19321

PTL 2: Japanese Unexamined Patent Application Publication No. 2009-109542

PTL 3: Japanese Unexamined Patent Application Publication No. 2000-192040

SUMMARY OF INVENTION

Technical Problem

The present invention provides a liquid crystal display device that includes a particular liquid crystal composition and a color filter containing a particular pigment, prevents a decrease in voltage retention ratio (VHR) and an increase in ion density (ID) in the liquid crystal layer, and resolves the problems of display defects, such as white streaks, alignment nonuniformity, and image sticking.

Solution to Problem

The inventors of this application have extensively studied the combination of the structure of the liquid crystal materials constituting the liquid crystal layer and the coloring materials, such as dyes and pigments, that constitute the color filter to address the problems described above. The inventors have then found that a liquid crystal display device that includes a particular liquid crystal material structure and a color filter that uses a pigment having a particular structure is capable of preventing the decrease in voltage holding ratio (VHR) and an increase in ion density (ID) in the liquid crystal layer and resolving display defects such as white streaks, alignment nonuniformity, and image sticking. Thus, the present invention has been made.

In other words, the present invention provides a liquid crystal display device that includes a first substrate, a second substrate, a liquid crystal composition layer held between the first substrate and the second substrate, a color filter that includes a black matrix and at least RGB three-color pixel portions, a pixel electrode, and a common electrode.
The liquid crystal composition layer is constituted by a liquid crystal composition that contains 30 to 50% of a compound represented by general formula (I)

[Chem. 1]

(I)

(In the formula, $R^1$ and $R^2$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms and A represents a 1,4-phenylene group or a trans-1,4-cyclohexylene group), 5 to 20% of a compound represented by general formula (II-1)

[Chem. 2]

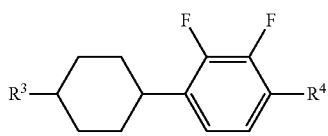

(II-1)

(In the formula, $R^3$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms and $R^4$ represents an alkyl group having 1 to 8 carbon atoms, an alkenyl group having 4 to 8 carbon atoms, an alkoxy group having 1 to 8 carbon atoms, or an alkenyloxy group having 3 to 8 carbon atoms), and 25 to 45% of a compound represented by general formula (II-2)

[Chem. 3]

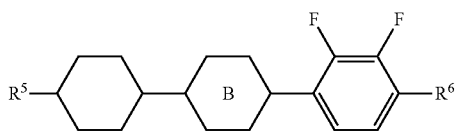

(II-2)

(In the formula, $R^5$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, $R^6$ represents an alkyl group having 1 to 8 carbon atoms, an alkenyl group having 4 to 8 carbon atoms, an alkoxy group having 1 to 8 carbon atoms, or an alkenyloxy group having 3 to 8 carbon atoms, and B represents a trans-1,4-cyclohexylene group or a 1,4-phenylene group which may be substituted with fluorine). A G pixel portion of the RGB three-color pixel portions contains, as a coloring material, a halogenated metal phthalocyanine pigment that has, as a central metal, a metal selected from the group consisting of Al, Si, Sc, Ti, V, Mg, Fe, Co, Ni, Zn, Ga, Ge, Y, Zr, Nb, In, Sn, and Pb, where when the central metal is trivalent, the central metal is bonded to one halogen atom, hydroxyl group, or sulfonic acid group or is oxo- or thio-bridged and when the central metal is a tetravalent metal, the central metal is bonded to one oxygen atom or two selected from a halogen atom, a hydroxyl group, and a sulfonic acid group, the selected two being the same or different from each other.

Advantageous Effects of Invention

Since the liquid crystal display device of the present invention uses a particular liquid crystal composition and a color filter that uses a particular pigment, a decrease in voltage holding ratio (VHR) and an increase in ion density (ID) in the liquid crystal layer can be prevented and display defects such as white streaks, alignment nonuniformity, and image sticking can be prevented.

BRIEF DESCRIPTION OF DRAWINGS

REFERENCE SIGNS LIST 1 substrate
2 color filter layer
2a color filter layer containing a particular pigment
3a transparent electrode layer (common electrode)
3b pixel electrode layer
4 alignment film
5 liquid crystal layer
5a liquid crystal layer containing a particular liquid crystal composition
Description Of Embodiments
FIG. 2 shows an example of a liquid crystal display device according to the present invention. A transparent electrode layer (3a) that serves as a common electrode and a color filter layer (2a) that contains a particular pigment are held between one of two substrate (1), i.e., a first substrate and a second substrate, each having an alignment film (4), and the alignment film of that one substrate. A pixel electrode layer (3b) is held between the other substrate and the alignment film of that substrate. These substrates are arranged so that the alignment films face each other and a liquid crystal layer (5a) containing a particular liquid crystal composition is held between the alignment films.

Figure 1:
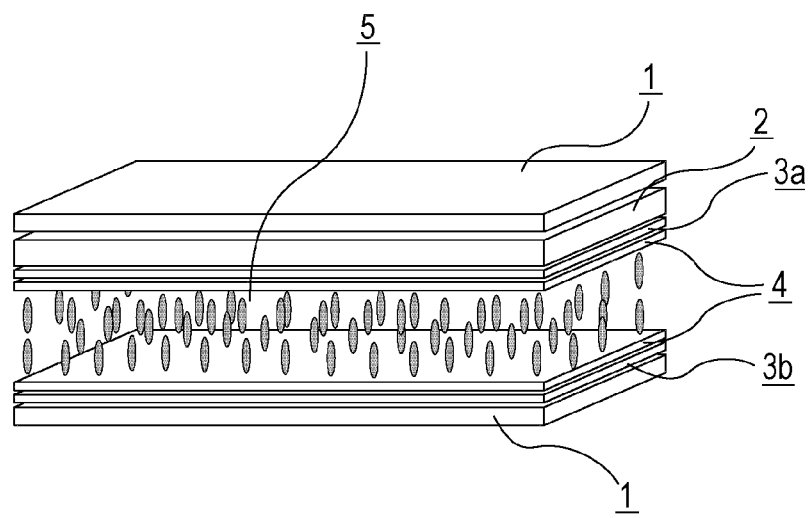
FIG. 1 is a diagram showing an example of a conventional typical liquid crystal display device.
Figure 2:
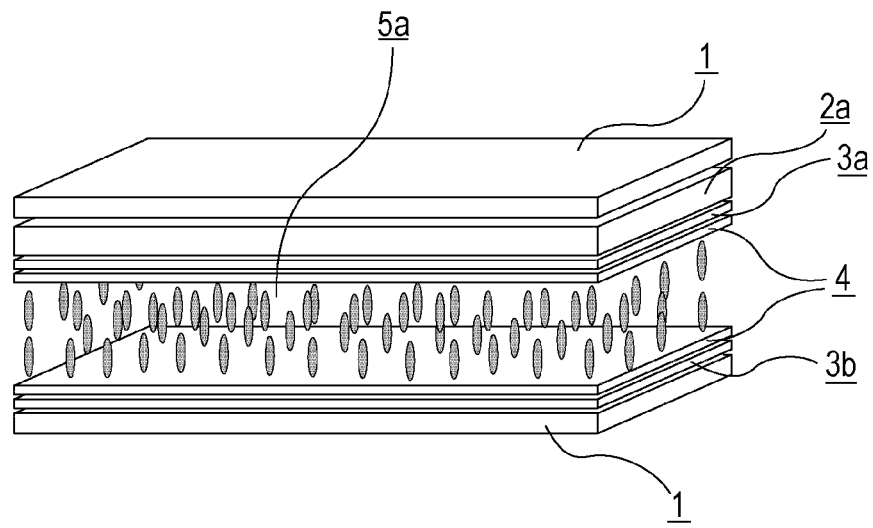
FIG. 2 is a diagram showing an example of a liquid crystal display device according to the present invention.

The two substrates of the display device are bonded to each other with a sealing material and an encapsulating material disposed in the peripheral region. In most cases, granular spacers or resin spacer columns photolithographically formed are disposed between the two substrates to maintain the substrate-to-substrate distance.

(Liquid Crystal Layer)

The liquid crystal layer of the liquid crystal display device of the present invention is composed of a liquid crystal composition that contains 30 to 50% of a compound represented by general formula (I)

[Chem. 4]

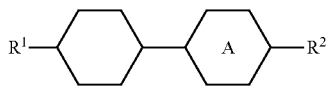
(I)

(In the formula, $R^1$ and $R^2$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms and A represents a 1,4-phenylene group or a trans-1,4-cyclohexylene group), 5 to 20% of a compound represented by general formula (II-1)

[Chem. 5]

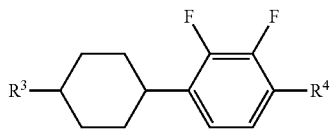
(II-1)

(In the formula, $R^3$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms and $R^4$ represents an alkyl group having 1 to 8 carbon atoms, an alkenyl group having 4 to 8 carbon atoms, an alkoxy group having 1 to 8 carbon atoms, or an alkenyloxy group having 3 to 8 carbon atoms), and 25 to 45% of a compound represented by general formula (II-2)

[Chem. 6]

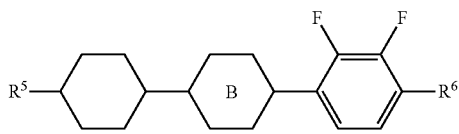
(II-2)

(In the formula, $R^5$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, $R^6$ represents an alkyl group having 1 to 8 carbon atoms, an alkenyl group having 4 to 8 carbon atoms, an alkoxy group having 1 to 8 carbon atoms, or an alkenyloxy group having 3 to 8 carbon atoms, and B represents a trans-1,4-cyclohexylene group or a 1,4-phenylene group which may be substituted with fluorine.)

The liquid crystal layer of the liquid crystal display device of the present invention contains 30 to 50%, preferably 35 to 45%, and more preferably 38 to 42% of the compound represented by general formula (I).

In general formula (I), $R^1$ and $R^2$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms.

However, preferably, $R^1$ and $R^2$ each independently represent an alkyl group having 1 to 5 carbon atoms, an alkenyl group having 2 to 5 carbon atoms, an alkoxy group having 1 to 5 carbon atoms, or an alkenyloxy group having 2 to 5 carbon atoms.

More preferably, $R^1$ and $R^2$ each independently represent an alkyl group having 2 to 5 carbon atoms, an alkenyl group having 2 to 4 carbon atoms, an alkoxy group having 1 to 4 carbon atoms, or an alkenyloxy group having 2 to 4 carbon atoms.

Preferably, $R^1$ represents an alkyl group. In such a case, an alkyl group having 1, 3, or 5 carbon atoms is particularly preferable.

$R^1$ and $R^2$ may be the same or different but are preferably different from each other. If $R^1$ an $R^2$ are alkyl groups, the alkyl groups particularly preferably have different numbers of carbon atoms and preferably have 1, 3, or 5 carbon atoms.

A compound represented by general formula (I) in which at least one substituent selected from $R^1$ and $R^2$ is an alkyl group having 3 to 5 carbon atoms preferably accounts for 50% or more, more preferably 70% or more, and most preferably 80% or more of the compound represented by general formula (I). A compound represented by general formula (I) in which at last one substituent selected from $R^1$ and $R^2$ is an alkyl group having 3 carbon atoms preferably accounts for 50% or more, more preferably 70% or more, yet more preferably 80% or more, and most preferably 100% of the compound represented by general formula (I).

A represents a 1,4-phenylene group or a trans-1,4-cyclohexylene group but preferably represents a trans-1,4-cyclohexylene group. A compound represented by general formula (I) with A representing a trans-1,4-cyclohexylene group preferably accounts for 50% or more, more preferably 70% or more, and yet more preferably 80% or more of the compound represented by general formula (I).

Preferable specific examples of the compound represented by general formula (I) are compounds represented by general formulae (Ia) to (Ik) below:

[Chem. 7]

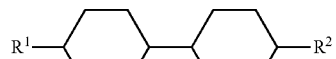
(Ia)

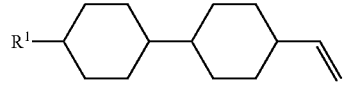
(Ib)

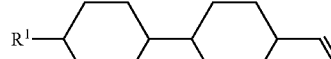
(Ic)

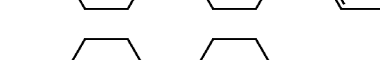
(Id)

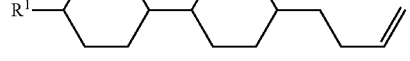
(Ie)

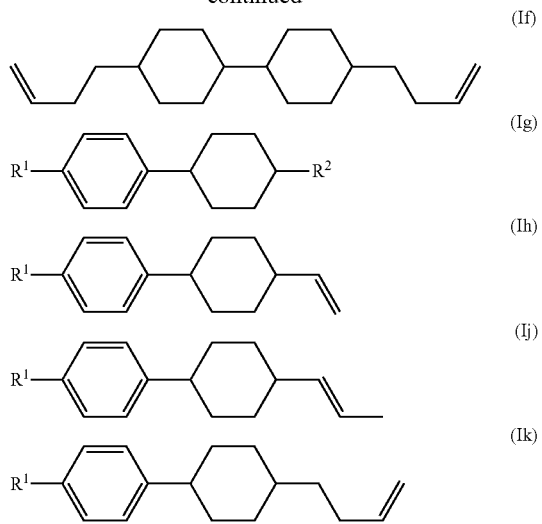

(In the formulae, $R^1$ and $R^2$ each independently represent an alkyl group having 1 to 5 carbon atoms or an alkoxy group having 1 to 5 carbon atoms but are preferably the same as the embodiments of $R^1$ and $R^2$ of general formula (I).)

Among general formulae (Ia) to (Ik), general formulae (Ia), (Ib), and (Ig) are preferable, general formulae (Ia) and (Ig) are more preferable, and general formula (Ia) is particularly preferable. In the case where the response speed is important, general formula (Ib) is also preferable. In the case where the response speed is particularly important, general formulae (Ib), (Ie), (If), and (Ih) are preferable. Dialkenyl compounds represented general formulae (Ie) and (If) are preferable when the response speed is critical.

From these viewpoints, the compounds represented by general formulae (Ia) and (Ig) preferably account for 50% or more, more preferably 70% or more, yet more preferably 80% or more, and most preferably 100% of the compound represented by general formula (I). The compound represented by general formula (Ia) preferably accounts for 50% or more, more preferably 70% or more, and yet more preferably 80% or more of the compound represented by general formula (I).

The liquid crystal layer of the liquid crystal display device of the present invention contains 5 to 20%, preferably 10 to 15%, and more preferably 12 to 14% of the compound represented by general formula (II-1).

In general formula (II-1), $R^3$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms. $R^3$ preferably represents an alkyl group having 1 to 5 carbon atoms or an alkenyl group having 2 to 5 carbon atoms, more preferably represents an alkyl group having 2 to 5 carbon atoms or an alkenyl group having 2 to 4 carbon atoms, yet more preferably represents an alkyl group having 3 to 5 carbon atoms or an alkenyl group having 2 carbon atoms, and most preferably represents an alkyl group having 3 carbon atoms.

$R^4$ represents an alkyl group having 1 to 8 carbon atoms, an alkenyl group having 4 to 8 carbon atoms, an alkoxy group having 1 to 8 carbon atoms, or an alkenyloxy group having 3 to 8 carbon atoms. $R^4$ preferably represents an alkyl group having 1 to 5 carbon atoms or an alkoxy group having 1 to 5 carbon atoms, more preferably represents an alkyl group having 1 to 3 carbon atoms or an alkoxy group having 1 to 3 carbon atoms, yet more preferably represents an alkyl group having 3 carbon atoms or an alkoxy group having 2 carbon atoms, and most preferably represents an alkoxy group having 2 carbon atoms.

The compound represented by general formula (II-1) is specifically preferably compounds represented by general formulae (II-1a) and (II-1b) below:

[Chem. 8]

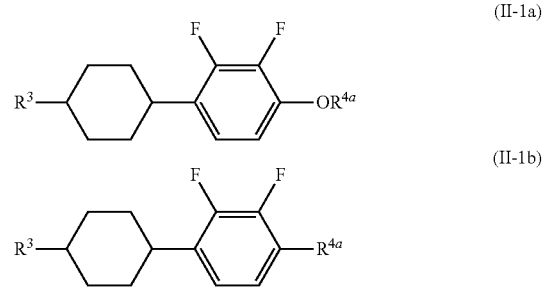

(In the formulae, $R^3$ represents an alkyl group having 1 to 5 carbon atoms or an alkenyl group having 2 to 5 carbon atoms, and $R^{4a}$ represents an alkyl group having 1 to 5 carbon atoms.)

$R^3$ in general formula (II-1a) is preferably the same as those embodiments for general formula (II-1). $R^{4a}$ is preferably an alkyl group having 1 to 3 carbon atoms, more preferably an alkyl group having 1 or 2 carbon atoms, and most preferably an alkyl group having 2 carbon atoms.

$R^3$ in general formula (II-1b) is preferably the same as those embodiments in general formula (II-1). $R^{4a}$ is preferably an alkyl group having 1 to 3 carbon atoms, more preferably an alkyl group having 1 or 3 carbon atoms, and most preferably an alkyl group having 3 carbon atoms.

Among general formulae (II-1a) and (II-1b), general formula (II-1a) is preferable for increasing the absolute value of the dielectric anisotropy.

The liquid crystal layer of the liquid crystal display device of the present invention contains 25 to 45%, preferably 30 to 40%, and more preferably 31 to 36% of the compound represented by general formula (II-2).

In general formula (II-2), $R^5$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms. $R^5$ preferably represents an alkyl group having 1 to 5 carbon atoms or an alkenyl group having 2 to 5 carbon atoms, more preferably represents an alkyl group having 2 to 5 carbon atoms or an alkenyl group having 2 to 4 carbon atoms, yet more preferably represents an alkyl group having 3 to 5 carbon atoms or an alkenyl group having 2 carbon atoms, and most preferably represents an alkyl group having 3 carbon atoms.

$R^6$ represents an alkyl group having 1 to 8 carbon atoms, an alkenyl group having 4 to 8 carbon atoms, an alkoxy group having 1 to 8 carbon atoms, or an alkenyloxy group having 3 to 8 carbon atoms. $R^6$ preferably represents an alkyl group having 1 to 5 carbon atoms or an alkoxy group having 1 to 5 carbon atoms, more preferably represents an alkyl group having 1 to 3 carbon atoms or an alkoxy group having 1 to 3 carbon atoms, yet more preferably represents an alkyl group having 3 carbon atoms or an alkoxy group having 2 carbon atoms, and most preferably represents an alkoxy group having 2 carbon atoms.

B represents a trans-1,4-cyclohexylene group or a 1,4-phenylene group which may be substituted with fluorine. B preferably represents an unsubstituted 1,4-phenylene group or a trans-1,4-cyclohexylene group and more preferably represents a trans-1,4-cyclohexylene group.

Preferable specific examples of the compound represented by general formula (II-2) include compounds represented by general formulae (II-2a) to (II-2d) below.

[Chem. 9]

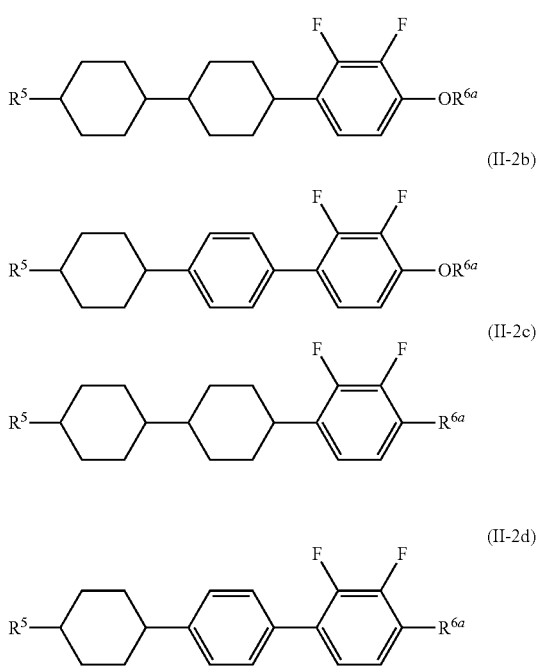

(In the formulae, $R^5$ represents an alkyl group having 1 to 5 carbon atoms or an alkenyl group having 2 to 5 carbon atoms and $R^{6a}$ represents an alkyl group having 1 to 5 carbon atoms.)

In general formulae (II-2a) and (II-2b), $R^5$ is preferably the same as the embodiments for general formula (II-2). $R^{6a}$ preferably represents an alkyl group having 1 to 3 carbon atoms, more preferably represents an alkyl group having 1 or 2 carbon atoms, and most preferably represents an alkyl group having 2 carbon atoms.

$R^5$ in general formulae (II-2c) and (II-2d) is preferably the same as the embodiments for general formula (II-2). $R^{6a}$ preferably represents an alkyl group having 1 to 3 carbon atoms, more preferably represents an alkyl group having 1 or 3 carbon atoms, and most preferably represents an alkyl group having 3 carbon atoms.

Among general formulae (II-2a) and (II-2b), general formula (II-2a) is preferable for increasing the absolute value of the dielectric anisotropy.

At least one compound represented by general formula (II-2) with B representing a 1,4-phenylene group and at least one compound represented by general formula (II-2) with B representing a trans-1,4-cyclohexylene group are preferably contained.

The liquid crystal layer of the liquid crystal display device of the present invention preferably further contains a compound represented by general formula (III)

[Chem. 10]

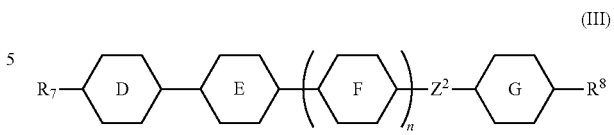

(In the formula, $R^7$ and $R^8$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; D, E, F, and G each independently represent trans-1,4-cyclohexylene or a 1,4-phenylene group which may be substituted with fluorine; $Z^2$ represents a single bond, —OCH$_2$—, —OCO—, —CH$_2$O—, or —COO—; n represents 0 or 1; and when n represents 0, $Z^2$ represents —OCH$_2$—, —OCO—, —CH$_2$O—, or —COO— or D, E and G each represent a 1,4-phenylene group which may be substituted with fluorine.) The content of the compound represented by general formula (III) is preferably 5 to 20%, preferably 8 to 15%, and more preferably 10 to 13%.

$R^7$ in general formula (III) represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms.

When D represents trans-1,4-cyclohexylene, $R^7$ preferably represents an alkyl group having 1 to 5 carbon atoms or an alkenyl group having 2 to 5 carbon atoms, more preferably represents an alkyl group having 2 to 5 carbon atoms or an alkenyl group having 2 to 4 carbon atoms, yet more preferably represents an alkyl group having 3 to 5 carbon atoms or an alkenyl group having 2 carbon atoms, and most preferably represents an alkyl group having 3 carbon atoms. When D represents a 1,4-phenylene group which may be substituted with fluorine, $R^7$ preferably represents an alkyl group having 1 to 5 carbon atoms or an alkenyl group having 4 or 5 carbon atoms, more preferably represents an alkyl group having 2 to 5 carbon atoms or an alkenyl group having 4 carbon atoms, and most preferably represents an alkyl group having 2 to 4 carbon atoms.

$R^8$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms.

When G represents trans-1,4-cyclohexylene, $R^8$ preferably represents an alkyl group having 1 to 5 carbon atoms or an alkenyl group having 2 to 5 carbon atoms, more preferably represents an alkyl group having 2 to 5 carbon atoms or an alkenyl group having 2 to 4 carbon atoms, yet more preferably represents an alkyl group having 3 to 5 carbon atoms or an alkenyl group having 2 carbon atoms, and most preferably represents an alkyl group having 3 carbon atoms. When G represents a 1,4-phenylene group which may be substituted with fluorine, $R^8$ preferably represents an alkyl group having 1 to 5 carbon atoms or an alkenyl group having 4 or 5 carbon atoms, more preferably represents an alkyl group having 2 to 5 carbon atoms or an alkenyl group having 4 carbon atoms, and most preferably represents an alkyl group having 2 to 4 carbon atoms.

When $R^7$ and $R^8$ each represent an alkenyl group and D or G bonded thereto represents a 1,4-phenylene group which may be substituted with fluorine, the alkenyl group having 4 or 5 carbon atoms preferably has a structure below:

[Chem. 11]

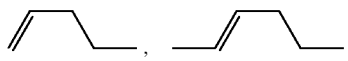

(In the formulae, the right end is to be bonded to the cyclic structure.)

In this case also, an alkenyl group having 4 carbon atoms is more preferable.

D, E, F, and G each independently represent trans-1,4-cyclohexylene or a 1,4-phenylene group which may be substituted with fluorine. D, E, F, and G preferably each independently represent a 2-fluoro-1,4-phenylene group, a 2,3-difluoro-1,4-phenylene group, a 1,4-phenylene group, or trans-1,4-cyclohexylene, more preferably represent a 2-fluoro-1,4-phenylene group, a 2,3-difluoro-1,4-phenylene group, or a 1,4-phenylene group, and most preferably represent a 2,3-difluoro-1,4-phenylene group or a 1,4-phenylene group.

$Z^2$ represents a single bond, —OCH$_2$—, —OCO—, —CH$_2$O—, or —COO—. $Z^2$ preferably represents a single bond, —CH$_2$O—, or —COO— and more preferably represents a single bond.

Although n represents 0 or 1, n preferably represents 0 when $Z^2$ represents a substituent other than a single bond.

Preferable specific examples of the compound represented by general formula (III) with n representing 0 include compounds represented by general formulae (III-1a) to (III-1h) below.

[Chem. 12]

(III-1a)
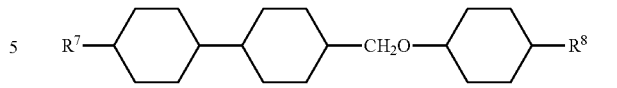

(III-1b)
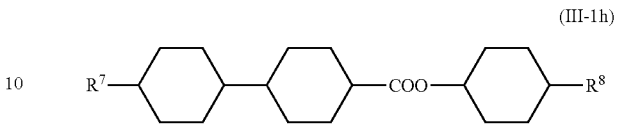

(III-1c)

(III-1d)
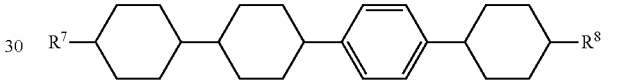

(III-1e)
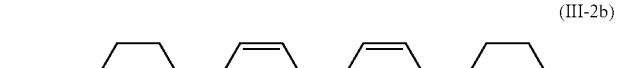

(III-1f)
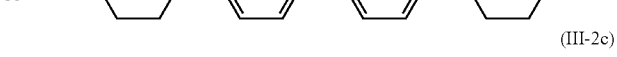

(III-1g)
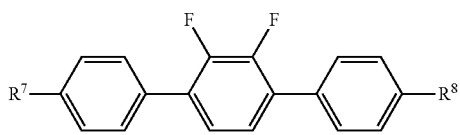

(III-1h)
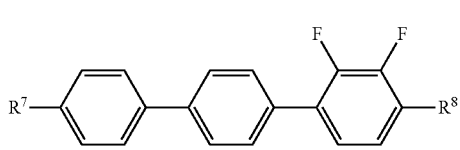

(In the formulae, $R^7$ and $R^8$ each independently represent an alkyl group having 1 to 5 carbon atoms, an alkenyl group having 2 to 5 carbon atoms, or an alkoxy group having 1 to 5 carbon atoms but are preferably the same as the embodiments for $R^7$ and $R^8$ in general formula (III).)

Preferable specific examples of the compound represented by general formula (III) with n representing 1 include compounds represented by general formulae (III-2a) to (III-2l) below.

[Chem. 13]

(III-2a)
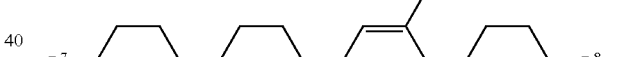

(III-2b)
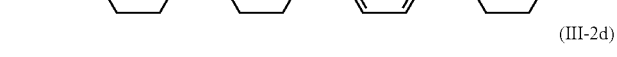

(III-2c)
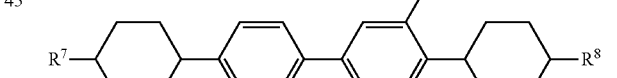

(III-2d)
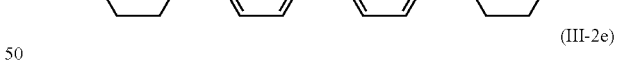

(III-2e)
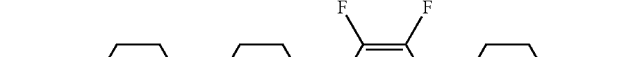

(III-2f)
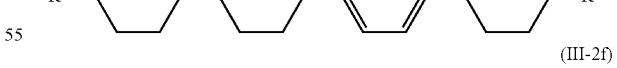

(III-2g)

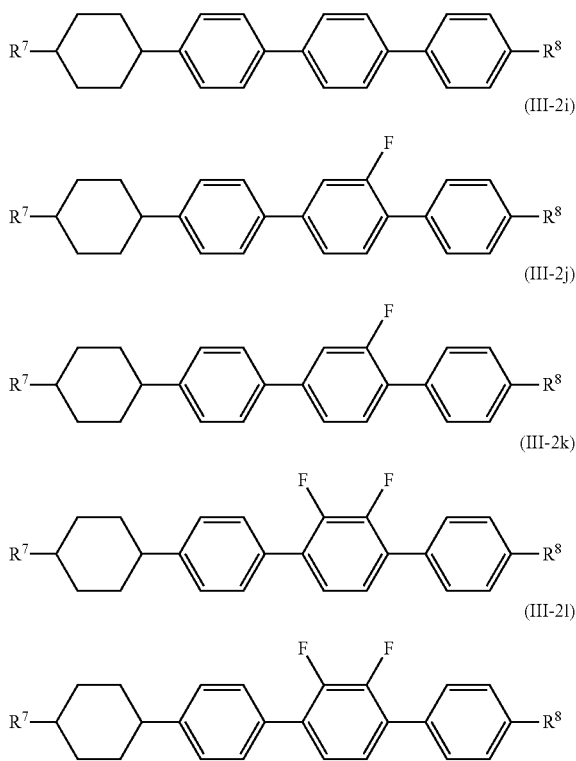

(In the formulae, $R^7$ and $R^8$ each independently represent an alkyl group having 1 to 5 carbon atoms, an alkenyl group having 2 to 5 carbon atoms, or an alkoxy group having 1 to 5 carbon atoms but are preferably the same as the embodiments for $R^7$ and $R^8$ in general formula (III).)

The compounds represented by general formulae (II-1) and (II-2) are both a compound having a negative dielectric anisotropy whose absolute value is relatively large. The total content of these compounds is preferably 30 to 65%, more preferably 40 to 55%, and most preferably 43 to 50%.

Compounds represented by general formula (III) may have a positive dielectric anisotropy or a negative dielectric anisotropy. In the case where a compound having a negative anisotropy whose absolute value is 0.3 or more is used, the total content of the compounds represented by general formulae (II-1), (II-2), and (III) is preferably 35 to 70%, more preferably 45 to 65%, and most preferably 50 to 60%.

Preferably, the composition contains 30 to 50% of the compound represented by general formula (I) and 35 to 70% of the compounds represented by general formulae (II-1), (II-2), and (III). More preferably, the composition contains 35 to 45% of the compound represented by general formula (I) and 45 to 65% of the compounds represented by general formulae (II-1), (II-2), and (III). Most preferably, the composition contains 38 to 42% of the compound represented by general formula (I) and 50 to 60% of the compounds represented by general formulae (II-1), (II-2), and (III).

The total content of the compounds represented by general formulae (I), (II-1), (II-2), and (III) relative to the entire composition is preferably 80 to 100%, more preferably 90 to 100%, and most preferably 95 to 100%.

The liquid crystal layer of the liquid crystal display device of the present invention can be used in a wide nematic phase-isotropic liquid phase transition temperature ($T_{ni}$) range. $T_{ni}$ is preferably 60° C. to 120° C., more preferably 70° C. to 100° C., and most preferably 70° C. to 85° C.

The dielectric anisotropy is preferably −2.0 to −6.0, more preferably −2.5 to −5.0, and most preferably −2.5 to −3.5 at 25° C.

The refractive index anisotropy is preferably 0.08 to 0.13 and more preferably 0.09 to 0.12 at 25° C. More specifically, when the cell gap is small, the refractive index anisotropy is preferably 0.10 to 0.12 and when the cell gap is large, the refractive index anisotropy is preferably 0.08 to 0.10.

The rotational viscosity (γ1) is preferably 150 or less, more preferably 130 or less, and most preferably 120 or less.

In the liquid crystal layer of the liquid crystal display device of the present invention, Z, which is a function of rotational viscosity and refractive index anisotropy, is preferably a particular value.

$$Z = \gamma 1 / \Delta n^2 \qquad [\text{Math. 1}]$$

(In the equation, γ1 represents rotational viscosity and Δn represents refractive index anisotropy.)

Z is preferably 13000 or less, more preferably 12000 or less, and most preferably 11000 or less.

The liquid crystal layer of the liquid crystal display device of the present invention must have a specific resistance of $10^{12}$ (Ω·m) or more, preferably $10^{13}$ (Ω·m) or more, and more preferably $10^{14}$ (Ω·m) or more when used in an active matrix display device.

The liquid crystal layer of the liquid crystal display device of the present invention may contain, in addition to the above-described compounds, typical nematic liquid crystals, smectic liquid crystals, cholesteric liquid crystals, an antioxidant, an ultraviolet light absorber, a polymerizable monomer, etc., if usage requires.

The polymerizable monomer is preferably a difunctional monomer represented by general formula (V)

[Chem. 14]

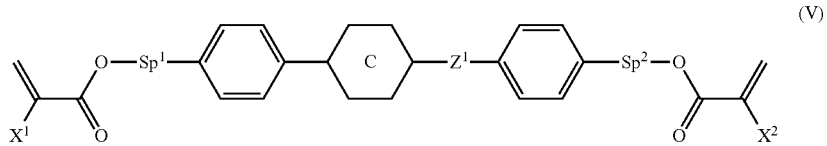

(In the formula, $X^1$ and $X^2$ each independently represent a hydrogen atom or a methyl group; $Sp^1$ and $Sp^2$ each independently represent a single bond, an alkylene group having 1 to 8 carbon atoms, or —O—$(CH_2)_s$— (in the formula, s represents an integer of 2 to 7 and the oxygen atom is to bond to an aromatic ring);
$Z^1$ represents —OCH$_2$—, —CH$_2$O—, —COO—, —OCO—, —CF$_2$O—, —OCF$_2$—, —CH$_2$CH$_2$—, —CF$_2$CF$_2$—, —CH=CH—COO—, —CH=CH—OCO—, —COO—CH=CH—, —OCO—CH=CH—, —COO—

—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CY$^1$=CY$^2$— (in the formula, Y$^1$ and Y$^2$ each independently represent a fluorine atom or a hydrogen atom), —C≡C—, or a single bond; and C represents a 1,4-phenylene group, a trans-1,4-cyclohexylene group, or a single bond wherein all 1,4-phenylene groups in the formula may each have any hydrogen atom substituted with a fluorine atom).

A diacrylate derivative with X$^1$ and X$^2$ each representing a hydrogen atom and a dimethacrylate derivative with X$^1$ and X$^2$ each representing a methyl group are both preferable. A compound in which one of X$^1$ and X$^2$ represents a hydrogen atom and the other represents a methyl group is also preferable. The polymerization rate of the diacrylate derivative is the highest among these, the polymerization rate of the dimethacrylate derivative is the lowest, and the polymerization rate of the asymmetric compound is in the middle. A preferable one may be selected according to the usage. In PSA display devices, dimethacrylate derivatives are particularly preferable.

Sp$^1$ and Sp$^2$ each independently represent a single bond, an alkylene group having 1 to 8 carbon atoms, or —O—(CH$_2$)$_s$—. For a PSA display device, at least one of Sp$^1$ and Sp$^2$ preferably represents a single bond and a compound with both Sp$^1$ and Sp$^2$ representing a single bond or an embodiment in which one of them represents a single bond and the other represents an alkylene group having 1 to 8 carbon atoms or —O—(CH$_2$)$_s$— are preferable. In such a case, an alkylene group having 1 to 4 carbon atoms is preferable and s is preferably 1 to 4.

Z$^1$ preferably represents —OCH$_2$—, —CH$_2$O—, —COO—, —OCO—, —CF$_2$O—, —OCF$_2$—, —CH$_2$CH$_2$—, —CF$_2$CF$_2$—, or a single bond, more preferably represents —COO—, —OCO—, or a single bond, and most preferably represents a single bond.

C represents a 1,4-phenylene group in which any hydrogen atom may be substituted with a fluorine atom, a trans-1,4-cyclohexylene group, or a single bond and preferably represents a 1,4-phenylene group or a single bond. If C represents a cyclic structure and not a single bond, Z$^1$ is preferably a linking group other than a single bond. When C represents a single bond, Z$^1$ preferably represents a single bond.

From these viewpoints, the cyclic structure between Sp$^1$ and Sp$^2$ in general formula (V) is specifically preferably a structure described below.

In the case where C represents a single bond and a cyclic structure is formed of two rings in general formula (V), the structures represented by formulae (Va-1) to (Va-5) below are preferable, the structures represented by formulae (Va-1) to (Va-3) are more preferable, and the structure represented by formula (Va-1) is most preferable.

[Chem. 15]

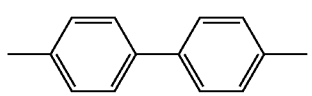
(Va-1)

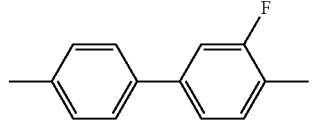
(Va-2)

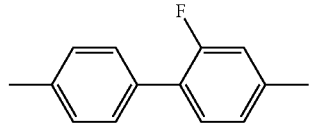
(Va-3)

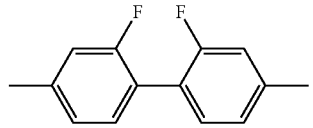
(Va-4)

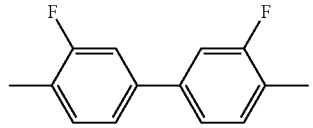
(Va-5)

(In the formulae, each end is to be bonded to Sp$^1$ or Sp$^2$.)

Polymerizable compounds containing these skeletons are optimum for PSA-mode liquid crystal display devices in terms of anchoring energy after polymerization. Since a good alignment state is achieved, display nonuniformity is suppressed or is completely prevented.

In view of the above, preferable polymerizable monomers are those represented by general formulae (V-1) to (V-4) below. In particular, general formula (V-2) is most preferable.

[Chem. 16]

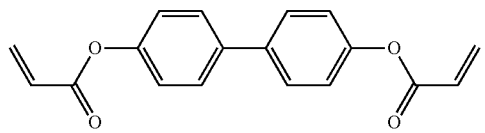
(V-1)

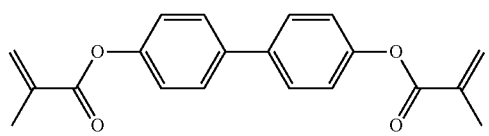
(V-2)

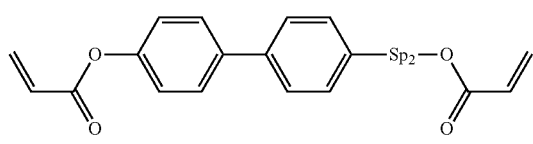
(V-3)

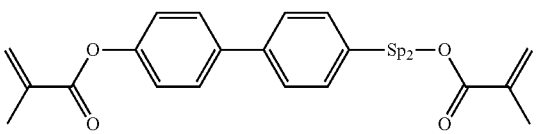
(V-4)

(In the formulae, Sp$^2$ represents an alkylene group having 2 to 5 carbon atoms.)

In the case where a polymerizable monomer is added, polymerization proceeds in the absence of a polymerization initiator but a polymerization initiator may be used to accelerate polymerization. Examples of the polymerization initiator include benzoin ethers, benzophenones, acetophenones, benzyl ketals, and acylphosphine oxides. A stabilizer may be added to improve the storage stability. Examples of the stabilizers that can be used include hydroquinones, hydroquinone monoalkyl ethers, tertiary butyl catechols, pyrogallols, thiophenols, nitro compounds, β-naphthylamines, β-napthols, and nitroso compounds.

A liquid crystal layer containing a polymerizable monomer is useful for liquid crystal display devices, in particular, active matrix drive liquid crystal display devices. It can also be used in PSA-mode, PSVA-mode, VA-mode, IPS-mode, and ECB-mode liquid crystal display devices.

A liquid crystal layer containing a polymerizable monomer is used in a liquid crystal display device in which a liquid crystal aligning ability is imparted as the polymerizable monomer is polymerized under irradiation with UV light and the amount of light passing through is controlled by using birefringence of the liquid crystal composition. The layer is useful in liquid crystal display devices such as AM-LCD (active matrix liquid crystal display device), TN (twisted nematic liquid crystal display device), STN-LCD (super twisted nematic liquid crystal display device), OCB-LCD, and IPS-LCD (in-plane switching liquid crystal display device) but is particularly useful in AM-LCD and can be used in transmitting-type or reflective type liquid crystal display devices.

(Color filter)

The color filter in the present invention includes a black matrix and at least RGB three-color pixel portions. Among the RGB three-color pixel portions, a G pixel portion contains, as a coloring material, a halogenated metal phthalocyanine pigment containing, as a central metal, a metal selected from the group consisting of Al, Si, Sc, Ti, V, Mg, Fe, Co, Ni, Zn, Ga, Ge, Y, Zr, Nb, In, Sn, and Pb. When the central metal is trivalent, the central metal is bonded to one halogen atom, hydroxyl group, or sulfonic acid group or is oxo- or thio-bridged. When the central metal is a tetravalent metal, the central metal is bonded to one oxygen atom or two selected from a halogen atom, a hydroxyl group, and a sulfonic acid group, the selected two being the same or different from each other. Among the RGB three-color pixel portions, the R pixel portion preferably contains a diketopyrrolopyrrole pigment and/or an anionic red organic dye as a coloring material and the B pixel portion preferably contains an ∈-type copper phthalocyanine pigment and/or a cationic blue organic dye as a coloring material.

(G Pixel Portion)

Examples of the halogenated metal phthalocyanine pigment in the G pixel portion are halogenated metal phthalocyanine pigments of the following two groups:

(First Group)

Halogenated metal phthalocyanine pigments that contain, as a central metal, a metal selected from the group consisting of Al, Si, Sc, Ti, V, Mg, Fe, Co, Ni, Zn, Ga, Ge, Y, Zr, Nb, In, Sn, and Pb, and eight to sixteen halogen atoms bonded to benzene rings of the phthalocyanine molecule per phthalocyanine molecule. When the central metal is trivalent, the central metal is bonded to one halogen atom, hydroxyl group, or sulfonic acid group ($-SO_3H$). When the central metal is a tetravalent metal, the central metal is bonded to one oxygen atom or two selected from a halogen atom, a hydroxyl group, and a sulfonic acid group, the selected two being the same or different from each other.

(Second Group)

Pigments composed of a halogenated metal phthalocyanine dimer having two halogenated metal phthalocyanine molecules as constitutional units each containing, as a central metal, a trivalent metal selected from the group consisting of Al, Sc, Ga, Y, and In and eight to sixteen halogen atoms bonded to benzene rings of the phthalocyanine molecule per phthalocyanine molecule, in which the central metals of the constitutional units are bonded to each other via a divalent atomic group selected from an oxygen atom, a sulfur atom, sulfinyl (—SO—), and sulfonyl (—$SO_2$—).

In the halogenated metal phthalocyanine pigment used in the present invention, the halogen atoms bonded to the benzene rings may be all the same or different from one another. Different halogen atoms may be bonded to the same benzene ring.

A halogenated metal phthalocyanine pigment which is used in the present invention and in which nine to fifteen bromine atoms among eight to sixteen halogen atoms are bonded to benzene rings of the phthalocyanine molecule per phthalocyanine molecule exhibits a bright yellowish green color and is optimum for use in a green pixel portion of a color filter. The halogenated metal phthalocyanine pigment used in the present invention is insoluble or slightly soluble in water or organic solvents. The halogenated metal phthalocyanine pigment used in the present invention refers to both a pigment (also called crude pigment) not subjected to a finishing treatment described below and a pigment subjected to the finishing treatment.

The halogenated metal phthalocyanine pigments belonging to the first group and the second group can be represented by general formula (PIG-1) below:

[Chem. 17]

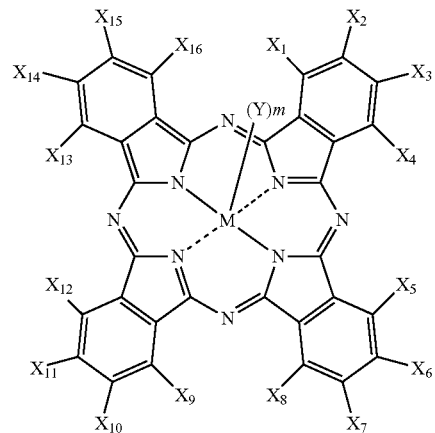

(PIG-1)

The halogenated metal phthalocyanine pigments belonging to the first group and represented by general formula (PIG-1) are as follows.

In general formula (PIG-1), $X_1$ to $X_{16}$ each represent a hydrogen atom, a chlorine atom, a bromine atom, or an iodine atom. The four atoms represented by X bonded to one benzene ring may be the same or different from one another. Among $X_1$ to $X_{16}$ bonded to four benzene rings, eight to sixteen are chlorine atoms, bromine atoms, or iodine atoms. M represents a central metal. Among halogenated metal phthalocyanine pigments having the same Y and the same number m of Y, those pigments in which the total number of chlorine atoms, bromine atoms, and iodine atoms is less than eight among sixteen atoms, namely, $X_1$ to $X_{16}$, are blue in color and those pigments in which the total number of chlorine atoms, bromine atoms, and iodine atoms is eight or more among sixteen atoms, namely, $X_1$ to $X_{16}$, becomes more yellowish in color as the total number increases. Y bonded to the central metal M is a monovalent atomic group selected from the group consisting of a halogen atoms which is fluorine, chorine, bromine, or iodine, an oxygen atom, a hydroxyl group, and a sulfonic acid group; and m represents the number of Y bonded to the central metal M and is an integer of 0 to 2.

The value of m is determined according to the valence of the central metal M. If the central metal M is trivalent as with Al, Sc, Ga, Y, and In, then m=1 and the central metal is bonded to one group selected from the group consisting of fluorine, chlorine, bromine, iodine, a hydroxyl group, and a sulfonic acid group. If the central metal M is tetravalent as with Si, Ti, V, Ge, Zr, or Sn, then m=2 and the central metal is bonded to one oxygen atom or two groups selected from the group consisting of fluorine, chlorine, bromine, iodine, a hydroxyl group, and a sulfonic acid group. If the central metal M is divalent as with Mg, Fe, Co, Ni, Zn, Zr, Sn, or Pb, then Y does not exist.

The halogenated metal phthalocyanine pigments belonging to the second group and represented by general formula (PIG-1) are as follows.

In general formula (PIG-1), $X_1$ to $X_{16}$ are as described above. The central metal M represents a trivalent metal selected from the group consisting of Al, Sc, Ga, Y, and In and m represents 1. Y represents the following atomic group:

[Chem. 18]

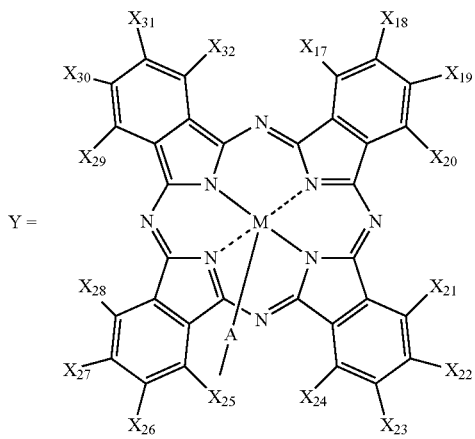

$Y =$

In the chemical structure of the atomic group Y, the central metal M is the same as above, and $X_{17}$ to $X_{32}$ are the same as $X_1$ to $X_{16}$ described with reference to general formula (PIG-1). A represents a divalent atomic group selected from the group consisting of an oxygen atom, a sulfur atom, sulfinyl (—SO—), and sulfonyl (—SO$_2$—). M in general formula (PIG-1) is bonded to M in the atomic group Y via a divalent atomic group A.

In other words, a halogenated metal phthalocyanine pigment belonging to the second group is a halogenated metal phthalocyanine dimer having two molecules of halogenated metal phthalocyanine as constitutional units, the two molecules being bonded to each other via the above-described divalent atomic group.

Specific examples of halogenated metal phthalocyanine pigments represented by general formula (PIG-1) include the following (1) to (4):

(1) A halogenated metal phthalocyanine pigment containing a divalent metal selected from the group consisting of Mg, Fe, Co, Ni, Zn, Zr, Sn, and Pb as a central metal and eight to sixteen halogen atoms bonded to four benzene rings per phthalocyanine molecule. Examples of such a pigment include halogenated tin phthalocyanine pigments, halogenated nickel phthalocyanine pigments, and halogenated zinc phthalocyanine pigments. Among these, a chlorinated brominated zinc phthalocyanine pigment is C.I. Pigment Green 58 and is particularly preferable.

(2) A halogenated metal phthalocyanine pigment containing a trivalent metal selected from the group consisting of Al, Sc, Ga, Y, and In as a central metal and eight to sixteen halogen atoms bonded to four benzene rings per phthalocyanine molecule, in which one halogen atom, hydroxyl group, or sulfonic acid group is bonded to the central metal. Examples of such a pigment include halogenated chloroaluminum phthalocyanine.

(3) A halogenated metal phthalocyanine pigment containing a tetravalent metal selected from the group consisting of Si, Ti, V, Ge, Zr, and Sn as a central metal and eight to sixteen halogen atoms bonded to four benzene rings per phthalocyanine molecule, in which two selected from a halogen atom, a hydroxyl group, and a sulfonic acid group and being the same or different from each other are bonded to the central metal. Examples of such a pigment include halogenated oxytitanium phthalocyanine and halogenated oxyvanadium phthalocyanine.

(4) A pigment composed of a halogenated metal phthalocyanine dimer having two halogenated metal phthalocyanine molecules as constitutional units each containing a trivalent metal selected from the group consisting of Al, Sc, Ga, Y, and In as a central metal and eight to sixteen halogen atoms bonded to four benzene rings per phthalocyanine molecule, in which the central metals of the constitutional units are bonded to each other via a divalent atomic group selected from the group consisting of an oxygen atom, a sulfur atom, sulfinyl, and sulfonyl. Examples of such a pigment include a halogenated μ-oxo-aluminum phthalocyanine dimer and a halogenated μ-thio-aluminum phthalocyanine dimer.

(R Pixel Portion)

The R pixel portion preferably contains a diketopyrrolopyrrole pigment and/or an anionic red organic dye. Specific examples of the diketopyrrolopyrrole include C.I. Pigment Red 254, 255, 264, and 272, and Orange 71 and 73. More preferable are Red 254, 255, 264, and 272 and particularly preferable is C.I. Pigment Red 254. Preferable examples of the anionic red organic dye include C.I. Solvent Red 124 and Acid Red 52 and 289. C.I. Solvent Red 124 is particularly preferable.

(B Pixel Portion)

The B pixel portion preferably contains an ∈-type copper phthalocyanine pigment and/or a cationic blue organic dye. The ∈-type copper phthalocyanine pigment is C.I. Pigment Blue 15:6. Preferable examples of the cationic blue organic dye include C.I. Solvent Blue 2, 3, 4, 5, 6, 7, 23, 43, 72, and 124, and C.I. Basic Blue 7 and 26. C.I. Solvent Blue 7 and Basic Blue 7 are more preferable and C.I. Solvent Blue 7 is particularly preferable.

Among the RGB three-color pixel portions, the R pixel portion preferably contains C.I. Solvent Red 124 as a coloring material; the G pixel portion preferably contains a halogenated metal phthalocyanine pigment containing, as a central metal, a metal selected from the group consisting of Al, Si, Sc, Ti, V, Mg, Fe, Co, Ni, Zn, Ga, Ge, Y, Zr, Nb, In, Sn, and Pb, in which when the central metal is trivalent, the central metal is bonded to one halogen atom, hydroxyl group, or sulfonic acid group or is oxo- or thio-bridged, and when the central metal is a tetravalent metal, the central metal is bonded to one oxygen atom or two selected from a halogen atom, a hydroxyl group, and a sulfonic acid group, the selected two being the same or different from each other; and the B pixel portion preferably contains C.I. Solvent Blue 7.

Among the RGB three-color pixel portions, the R pixel portion preferably contains C.I. Pigment Red 254 as a coloring material; the G pixel portion preferably contains a halogenated metal phthalocyanine pigment containing, as a central metal, a metal selected from the group consisting of Al, Si, Sc, Ti, V, Mg, Fe, Co, Ni, Zn, Ga, Ge, Y, Zr, Nb, In, Sn, and Pb, in which when the central metal is trivalent, the central metal is bonded to one halogen atom, hydroxyl group, or sulfonic acid group or is oxo- or thio-bridged, and when the central metal is a tetravalent metal, the central metal is bonded to one oxygen atom or two selected from a halogen atom, a hydroxyl group, and a sulfonic acid group, the selected two being the same or different from each other; and the B pixel portion preferably contains C.I. Pigment Blue 15:6.

Among the RGB three-color pixel portions, the R pixel portion preferably further contains, as a coloring material, at least one organic dye or pigment selected from the group consisting of C.I. Pigment Red 177, 242, 166, 167, and 179, C.I. Pigment Orange 38 and 71, C.I. Pigment Yellow 150, 215, 185, 138, and 139, C.I. Solvent Red 89, C.I. Solvent Orange 56, and C.I. Solvent Yellow 21, 82, 83:1, 33, and 162.

Among the RGB three-color pixel portions, the G pixel portion preferably further contains, as a coloring material, at least one organic dye or pigment selected from the group consisting of C.I. Pigment Yellow 150, 215, 185, and 138, and C.I. Solvent Yellow 21, 82, 83:1, and 33.

Among the RGB three-color pixel portions, the B pixel portion preferably further contains, as a coloring material, at least one organic dye or pigment selected from the group consisting of C.I. Pigment Blue 1, C.I. Pigment Violet 23, C.I. Basic Blue 7, C.I. Basic Violet 10, C.I. Acid Blue 1, 90, and 83, and C.I. Direct Blue 86.

The color filter preferably includes a black matrix, RGB three-color pixel portions, and an Y pixel portion and the Y pixel portion preferably contains at least one yellow organic dye or pigment selected from the group consisting of C.I. Pigment Yellow 150, 215, 185, 138, and 139, and C.I. Solvent Yellow 21, 82, 83:1, 33, and 162.

The chromaticity x and chromaticity y of each pixel portion of the color filter of the present invention in the XYZ colorimetric system under a C illuminant is preferably as follows in order to prevent the decrease in voltage holding ratio (VHR) and the increase in ion density (ID) of the liquid crystal layer and suppress occurrence of display defects such as white streaks, alignment nonuniformity, and image sticking.

The chromaticity x of the R pixel portion in the XYZ colorimetric system under a C illuminant is preferably 0.58 to 0.69 and more preferably 0.62 to 0.68. The chromaticity y is preferably 0.30 to 0.36 and more preferably 0.31 to 0.35. Preferably, the chromaticity x is 0.58 to 0.69 while the chromaticity y is 0.30 to 0.36. More preferably, the chromaticity x is 0.62 to 0.68 while the chromaticity y is 0.31 to 0.35.

The chromaticity x of the G pixel portion in the XYZ colorimetric system under a C illuminant is preferably 0.19 to 0.32 and more preferably 0.20 to 0.26 and the chromaticity y is preferably 0.60 to 0.76 and more preferably 0.68 to 0.74. Preferably, the chromaticity x is 0.19 to 0.32 while the chromaticity y is 0.60 to 0.76. More preferably, the chromaticity x is 0.20 to 0.26 while the chromaticity y is 0.68 to 0.74.

The chromaticity x of the B pixel portion in the XYZ colorimetric system under a C illuminant is preferably 0.11 to 0.16 and more preferably 0.12 to 0.15 and the chromaticity y is preferably 0.04 to 0.15 and more preferably 0.05 to 0.10. Preferably, the chromaticity x is 0.11 to 0.16 while the chromaticity y is 0.04 to 0.15. More preferably, the chromaticity x is 0.12 to 0.15 and the chromaticity y is more preferably 0.05 to 0.10.

The chromaticity x of the Y pixel portion in the XYZ colorimetric system under a C illuminant is preferably 0.46 to 0.50 and more preferably 0.47 to 0.48 and the chromaticity y is preferably 0.48 to 0.53 and more preferably 0.50 to 0.52. More preferably, the chromaticity x is 0.46 to 0.50 while the chromaticity y is 0.48 to 0.53. Yet more preferably, the chromaticity x is 0.47 to 0.48 while the chromaticity y is 0.50 to 0.52.

The XYZ colorimetric system referred here is a standard colorimetric system approved by CIE (Commission Internationale de l'Eclairage) in 1931.

The chromaticity of each pixel portion can be adjusted by changing the types of the dyes and pigments used and the mixing ratio of the dyes and pigments. For example, in the case of a R pixel, the chromaticity can be adjusted by mixing appropriate amounts of a yellow dye or pigment and/or an orange pigment to a red dye or pigment. In the case of a G pixel, the chromaticity can be adjusted by mixing an appropriate amount of a yellow dye or pigment to a green dye or pigment. In the case of a B pixel, the chromaticity can be adjusted by adding an appropriate amount of purple dye or pigment to a blue dye or pigment. The chromaticity can also be adjusted by appropriately adjusting the particle size of the pigment.

Color filter pixel portions of the color filter can be formed by a conventional method. A representative example of the method for forming pixel portions is photolithography. According to photolithography, a photocurable composition described below is applied to a surface of a color filter transparent substrate, the surface being a surface on which a black matrix is disposed, and heat-dried (prebaked), pattern exposure is conducted by irradiating the substrate with ultraviolet light through a photomask so as to cure the photocurable compound in portions corresponding to the pixel portions, and the unexposed portions are developed with a developer so as to remove the non-pixel portions and fix the pixel portions to the transparent substrate. According to this method, pixel portions constituted by cured color films of the photocurable composition are formed on the transparent substrate.

A photocurable composition described below is prepared for each of a R pixel, a G pixel, a B pixel, and, if needed, a Y pixel and a pixel of other color, and the operation described above is repeated. As a result, a color filter having color pixel portions including R pixels, G pixels, B pixels, and Y pixels at particular positions can be fabricated.

Examples of the method employed to coat a transparent substrate such as glass with a photocurable composition described below include a spin coating method, a slit coating method, a roll coating method, and an ink jet method.

The drying conditions of the films of the photocurable compositions applied to the transparent substrate differ according to the types of the components, blend ratios, and the like. Usually, the temperature is 50 to 150° C. and the time is about 1 to 15 minutes. Moreover, the light used in photocuring of the photocurable composition is preferably ultraviolet light having a wavelength in the range of 200 to 500 nm or visible light. Various illuminants that emit light within these wavelength ranges can be used.

Examples of the development method include puddle developing, dipping, and spraying. A transparent substrate that have undergone exposure of the photocurable composition and development and that has pixel portions of required colors formed thereon is rinsed with water and dried. A color filter obtained thereby is heat-treated (post-baked) for a particular time at 90° C. to 280° C. with a heater such as a hot plate or an oven so as to remove the volatile components in the color films and thermally cure unreacted photocurable compound remaining in the cured color films of the photocurable compositions. As a result, a color filter is obtained.

The coloring materials for the color filter of the present invention are used in combination with the liquid crystal composition of the present invention so as to provide a liquid crystal display device with which the decrease in voltage holding ratio (VHR) and the increase in ion density (ID) of the liquid crystal layer can be prevented and the display defects such as white streaks, alignment nonuniformity, and image sticking can be resolved.

A typical method for producing the photocurable composition uses a dye and/or a pigment composition for a color filter of the present invention, an organic solvent, and a dispersant as essential components and includes mixing and stirring these components into a homogeneous mixture so as to form a pigment dispersion for forming a pixel portion of the color filter, and adding a photocurable compound and, if needed, a thermoplastic resin, a photopolymerization initiator, or the like.

Examples of the organic solvent used here include aromatic solvents such as toluene, xylene, and methoxy benzene, acetic acid ester solvents such as ethyl acetate, propyl acetate, butyl acetate, propylene glycol monomethyl ether acetate, propylene glycol monoethyl ether acetate, diethylene glycol methyl ether acetate, diethylene glycol ethyl ether acetate, diethylene glycol propyl ether acetate, and diethylene glycol butyl ether acetate; propionate solvents such as ethoxyethyl propionate; alcohol solvents such as methanol and ethanol; ether solvents such as butyl cellosolve, propylene glycol monomethyl ether, diethylene glycol ethyl ether, and diethylene glycol dimethyl ether; ketone solvents such as methyl ethyl ketone, methyl isobutyl ketone, and cyclohexanone; aliphatic hydrocarbon solvents such as hexane; nitrogen compound solvents such as N,N-dimethylformamide, γ-butyrolactam, N-methyl-2-pyrrolidone, aniline, and pyridine; lactone solvents such as γ-butyrolactone; and carbamic acid esters such as a 48:52 mixture of methyl carbamate and ethyl carbamate.

Examples of the dispersant used include dispersants such as DISPERBYK 130, DISPERBYK 161, DISPERBYK 162, DISPERBYK 163, DISPERBYK 170, DISPERBYK 171, DISPERBYK 174, DISPERBYK 180, DISPERBYK 182, DISPERBYK 183, DISPERBYK 184, DISPERBYK 185, DISPERBYK 2000, DISPERBYK 2001, DISPERBYK 2020, DISPERBYK 2050, DISPERBYK 2070, DISPERBYK 2096, DISPERBYK 2150, DISPERBYK LPN21116, and DISPERBYK LPN6919 produced by BYK-Chemie GmbH, Efka 46, Efka 47, Efka 452, Efka LP4008, Efka 4009, Efka LP4010, Efka LP4050, LP4055, Efka 400, Efka 401, Efka 402, Efka 403, Efka 450, Efka 451, Efka 453, Efka 4540, Efka 4550, Efka LP4560, Efka 120, Efka 150, Efka 1501, Efka 1502, and Efka 1503 produced by EFKA, Solsperse 3000, Solsperse 9000, Solsperse 13240, Solsperse 13650, Solsperse 13940, Solsperse 17000, 18000, Solsperse 20000, Solsperse 21000, Solsperse 20000, Solsperse 24000, Solsperse 26000, Solsperse 27000, Solsperse 28000, Solsperse 32000, Solsperse 36000, Solsperse 37000, Solsperse 38000, Solsperse 41000, Solsperse 42000, Solsperse 43000, Solsperse 46000, Solsperse 54000, and Solsperse 71000 produced by The Lubrizol Corporation, and AJISPER PB711, AJISPER PB821, AJISPER PB822, AJISPER PB814, AJISPER PN411, and AJISPER PA111 produced by Ajinomoto Co., Inc., and water-insoluble synthetic resins liquid at room temperature, such as acrylic resins, urethane resins, alkyd resins, natural rosin such as wood rosin, gum rosin, and tall oil rosin, modified rosin such as polymerized rosin, disproportionated rosin, hydrogenated rosin, oxidized rosin, and maleated rosin, and rosin derivatives such as rosin amine, lime rosin, a rosin alkylene oxide adduct, a rosin alkyd adduct, and a rosin-modified phenol. Addition of these dispersants and resins also contributes to reduction of flocculation, improvement of dispersion stability of the pigment, and viscosity properties of the dispersant.

A dispersion aid such as an organic pigment derivative may also be contained. Examples thereof include methyl derivatives, sulfonic acid derivatives, N-(dialkylamino)methyl derivatives, and N-(dialkylaminoalkyl)sulfonic acid amide derivatives of phthalimide. Two or more different types of these derivatives may be used in combination.

Examples of the thermoplastic resin used in preparing the photocurable composition include urethane resins, acrylic resins, polyamide resins, polyimide resins, styrene maleic acid resins, and styrene maleic anhydride resins.

Examples of the photocurable compound include difunctional monomers such as 1,6-hexanediol diacrylate, ethylene glycol diacrylate, neopentyl glycol diacrylate, triethylene glycol diacrylate, bis(acryloxyethoxy)bisphenol A, and 3-methylpentanediol diacrylate, polyfunctional monomers with a relatively small molecular weight, such as trimethylolpropane triacrylate, pentaerythritol triacrylate, tris[2-(meth)acryloyloxyethyl)isocyanurate, dipentaerythritol hexaacrylate, and dipentaerythritol pentaacrylate, and polyfunctional monomers with a relatively large molecular weight such as polyester acrylate, polyurethane acrylate, and polyether acrylate.

Examples of the photopolymerization initiator include acetophenone, benzophenone, benzyl dimethyl ketanol, benzoyl peroxide, 2-chlorothioxanthone, 1,3-bis(4'-azidobenzal)-2-propane, 1,3-bis(4'-azidobenzal)-2-propane-2'-sulfonic acid, and 4,4'-diazidostilbene-2,2'-disulfonic acid. Examples of commercially available photopolymerization initiators include "IRGACURE (trade mark)-184", "IRGACURE (trade mark)-369", "DAROCUR (trade mark)-1173", and "Lucirin-TPO" produced by BASF Corporation, "KAYACURE (trade mark) DETX" and "KAYACURE (trade mark) OA" produced by NIPPON KAYAKU Co., Ltd., "VICURE 10" and "VICURE 55" produced by Stauffer Chemical Co., "TRIGONAL PI" produced by Akzo Chemicals B.V., "Sandorey 1000" produced by Sandoz, "DEAP" produced by Upjohn Co., Ltd., and "Biimidazole" produced by Kurogane Kasei Co., Ltd.

The photopolymerization initiator can be used in combination with a known photosensitizer. Examples of the photosensitizer include amines, ureas, compounds containing sulfur atoms, compounds containing phosphorus atoms, compounds containing chlorine atoms, nitriles, and other compounds that contain nitrogen atoms. These can be used alone or in combination.

The blend ratio of the photopolymerization initiator is not particularly limited but is preferably within a range of 0.1 to 30% on a mass basis relative to a photopolymerizable compound or a compound having a photocurable functional group. At less than 0.1%, the sensitivity during photocuring tends to decrease. At more than 30%, crystals of the photopolymerization initiator may precipitate during drying of the coating film of the pigment-dispersed resist and the physical properties of the coating film may be degraded.

The dye or pigment dispersion can be obtained by stirring and dispersing the materials described above to homogeneity so that 300 to 1000 parts of the organic solvent and 1 to 100 parts of the dispersant are used per 100 parts of the dye and/or pigment composition for the color filter according to the present invention on a mass basis. To the pigment dispersion, 3 to 20 parts of a thermoplastic resin and a photocurable compound in total per part of the pigment composition for the color filter of the present invention, 0.05 to 3 parts of a photopolymerization initiator per part of the photocurable compound, and, if needed, an organic solvent are added, and the resulting mixture is stirred and dispersed to homogeneity. As a result, a photocurable composition for forming color filter pixel portions can be obtained.

Known organic solvents and alkaline aqueous solutions can be used as the developer. In particular, when the photocurable composition contains a thermoplastic resin or a photocurable compound and at least one of these has an acid value and exhibits solubility in alkali, it is effective to employ washing with an alkaline aqueous solution in order to form color filter pixel portions.

While a method for producing color filter pixel portions through photolithography has been described in detail above, the color filter pixel portions prepared by using a pigment composition for a color filter according to the present invention may alternatively be formed by forming pixel portions of respective colors through other methods, such as an electrodeposition method, a transfer method, a micelle electrolysis method, a PVED (photovoltaic electrodeposition) method, an ink jet method, a reverse printing method, and a thermal curing method.

(Alignment Film)

If the liquid crystal display device of the present invention is of a type that requires alignment films on a surface of the first substrate and a surface of the second substrate that come into contact with the liquid crystal composition in order to align the liquid crystal composition, an alignment film is disposed between the color filter and the liquid crystal layer. However, even a thick alignment film is as thin as 100 nm or less, and does not completely block interactions between the coloring materials such as pigments constituting the color filter and the liquid crystal compound constituting the liquid crystal layer.

Moreover, in a liquid crystal display device that does not use alignment films, the interactions between the coloring materials such as pigments constituting the color filter and the liquid crystal compound constituting the liquid crystal layer are increased.

Examples of the alignment film material include transparent organic materials such as polyimide, polyamide, BCB (benzocyclobutene polymer), and polyvinyl alcohol. The alignment film is particularly preferably a polyimide alignment film prepared by imidization of a polyamic acid synthesized from a diamine, such as an aliphatic or alicyclic diamine, e.g., p-phenylene diamine or 4,4'-diaminodiphenylmethane, an aliphatic or alicyclic tetracarboxylic anhydride such as butane tetracarboxylic anhydride or 2,3,5-tricarboxy cyclopentyl acetic anhydride, and an aromatic tetracarboxylic anhydride such as pyromellitic dianhydride. In this case, rubbing is typically employed as an alignment imparting method; however, for use as a vertical alignment film, impartation of alignment may be omitted.

Materials containing chalocone, cinnamate, cinnamoyl, or a compound containing an azo group or the like can be used as the alignment film material. These may be used in combination with polyimide, polyamide, or the like. In such a case, the alignment film may be subjected to rubbing or photoalignment.

The alignment film is usually formed by forming a resin film by applying the alignment film material to a substrate through a spin coating method or the like. Alternatively, a uniaxial stretching method, a Langmuir-Blodgett method, or the like may be employed.

(Transparent Electrode)

An electrically conductive metal oxide can be used as the material for the transparent electrode of the liquid crystal display device of the present invention. Examples of the metal oxide include indium oxide ($In_2O_3$), tin oxide ($SnO_2$), zinc oxide (ZnO), indium tin oxide ($In_2O_3$—$SnO_2$), indium zinc oxide ($In_2O_3$—ZnO), niobium-doped titanium dioxide ($Ti_{1-x}Nb_xO_2$), fluorine-doped tin oxide, graphene nanoribbon, and metal nanowire. Among these, zinc oxide (ZnO), indium tin oxide ($In_2O_3$—$SnO_2$), and indium zinc oxide ($In_2O_3$—ZnO) are preferable. The patterning of the transparent conductive film may be performed by a photoetching method, a method that uses a mask, or the like.

The liquid crystal display device in combination with a backlight is used in various usages such as liquid crystal televisions, monitors for personal computers, cellular phones, displays of smart phones, laptop personal computers, portable information terminals, digital signage, and the like. Examples of the backlight include cold-cathode tube-type backlights, and two-wavelength peak white backlights and three-wavelength peak backlights that use organic EL elements or light-emitting diodes that use inorganic materials.

EXAMPLES

A part of the best mode of the present invention will now be described by way of Examples which do not limit the scope of the present invention. For the compositions of Examples and Comparative Examples below, "%" means "% by mass".

The following properties were measured in Examples.

$T_{ni}$: nematic phase-isotropic liquid phase transition temperature (° C.)

Δn: refractive index anisotropy at 25° C.

Δ∈: dielectric anisotropy at 25° C.

η: viscosity (mPa·s) at 20° C.

$γ_1$: rotational viscosity (mPa·s) at 25° C.

$d_{gap}$: gap (μm) between the first substrate and the second substrate of a cell VHR: voltage holding ratio (%) at 70° C.

(The ratio of a measured voltage to an initial voltage in terms of percent. The voltage on a 3.5 μm-thick cell containing a liquid crystal composition was measured under application of 5 V, a frame time of 200 ms, and a pulse width of 64 μs.)

ID: ion density ($pC/cm^2$) at 70° C.

(The ion density of a 3.5 μm-thick cell containing a liquid crystal composition was measured by using MTR-1 (TOYO Corporation) under application of 20 V at a frequency of 0.05 Hz.)

Image Sticking:

Evaluation of image sticking of a liquid crystal display device was done by causing a particular fixed pattern to be displayed in a display area for 1000 hours and observing the level of the retained image of the fixed pattern in a uniform display over the entire screen so as to rate the level of image sticking on the following four-point scale.

A: No retained image was observed.
B: A faint retained image was observed but the retained image level was acceptable.
C: An retained image was observed and the retained image level was unacceptable.
D: An retained image was observed and the retained image level was far from acceptable.

In Examples below, the following abbreviations are used in describing the compounds.

(Side Chain)

-n —$C_nH_{2n+1}$ Straight alkyl group having n carbon atoms
-On —$OC_nH_{2n+1}$ Straight alkoxy group having n carbon atoms (Cyclic Structure)

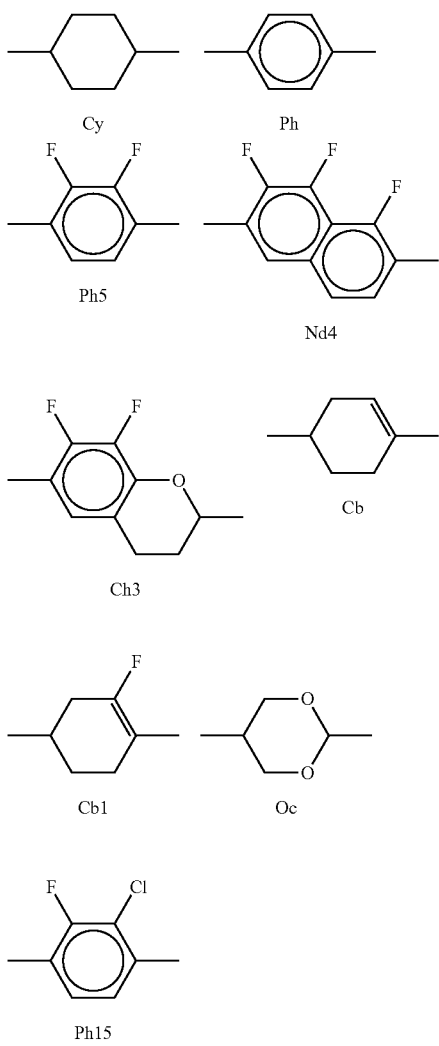

[Chem. 19]

[Production of Color Filter]
[Preparation of Color Compositions]
[Red Dye Color Composition 1]

Into a polyethylene bottle, 10 parts of a red dye 1 (C.I. Solvent Red 124) was placed. Thereto, 55 parts of propylene glycol monomethyl ether acetate and SEPR beads 0.3 to 0.4 mm in diameter were added. The resulting mixture was dispersed for 4 hours with a paint conditioner (produced by Toyo Seiki Seisaku-Sho Ltd.) and filtered through a 5 μm filter. As a result, a dye coloring liquid was obtained. In a disperser mixer, 75.00 parts of this dye coloring liquid, 5.50 parts of a polyester acrylate resin (ARONIX (trademark) M7100 produced by TOA GOSEI CO., LTD.), 5.00 parts of dipentaerythritol hexaacrylate (KAYARAD (trademark) DPHA, produced by Nippon Kayaku Co., Ltd.), 1.00 part of benzophenone (KAYACURE (trademark) BP-100, produced by Nippon Kayaku Co., Ltd.), and 13.5 parts of UKAR ESTER EEP were stirred. The resulting mixture was filtered through a filter with 1.0 μm pore size. As a result, a red dye color composition 1 was obtained.

[Red Dye Color Composition 2]

A red dye color composition 2 was obtained as described above except that 8 parts of the red dye 1 (C.I. Solvent Red 124) and 2 parts of a yellow dye 1 (C.I. Solvent Yellow 21) were used instead of 10 parts of the red dye 1 of the red dye color composition 1.

[Red Dye Color Composition 3]

A red dye color composition 3 was obtained as described above except that 10 parts of a red dye 2 (C.I. Solvent Red 1) was used instead of 10 parts of the red dye 1 of the red dye color composition 1.

[Green Dye Color Composition 1]

A green dye color composition 1 was obtained as described above except that 10 parts of a green dye 1 (C.I. Solvent Green 7) was used instead of 10 parts of the red dye 1 of the red dye color composition 1.

[Blue Dye Color Composition 1]

A blue dye color composition 1 was obtained as described above except that 10 parts of a blue dye 1 (C.I. Solvent Blue 7) was used instead of 10 parts of the red dye 1 of the red dye color composition 1.

[Blue Dye Color Composition 2]

A blue dye color composition 2 was obtained as described above except that 7 parts of a blue dye 1 (C.I. Solvent Blue 7) and 3 parts of a purple dye 1 (C.I. Basic Violet 10) were used instead of 10 parts of the blue dye 1 of the blue dye color composition 1.

[Blue Dye Color Composition 3]

A blue dye color composition 3 was obtained as described above except that 10 parts of a blue dye 2 (C.I. Solvent Blue 12) was used instead of 7 parts of the blue dye 1 and 3 parts of the purple dye 1 of the blue dye color composition 2.

[Yellow Dye Color Composition 1]

A yellow dye color composition 1 was obtained as described above except that 10 parts of a yellow dye 1 (C.I. Solvent Yellow 21) was used instead of 10 parts of the red dye 1 of the red dye color composition 1.

[Yellow Dye Color Composition 2]

A yellow dye color composition 2 was obtained as described above except that 10 parts of a yellow dye 4 (C.I. Solvent Yellow 2) was used instead of 10 parts of the yellow dye 1 of the yellow dye color composition 1.

[Red Pigment Color Composition 1]

Into a polyethylene bottle, 10 parts of a red pigment 1 (C.I. Pigment Red 254, "IRGAPHOR RED BT-CF" produced by BASF Corporation) was placed. Thereto, 55 parts of propylene glycol monomethyl ether acetate, 7.0 parts of DISPERBYK LPN21116 (produced by BYK-Chemie GmbH), and zirconia beads "ER-120S" having a diameter of 0.3 to 0.4 mm produced by Saint-Gobain K.K., were added. The resulting mixture was dispersed for 4 hours with a paint conditioner (produced by Toyo Seiki Seisaku-Sho Ltd.) and filtered with a 1 μm filter. As a result, a pigment dispersion was obtained.

In a disperser mixer, 75.00 parts of this pigment dispersion, 5.50 parts of a polyester acrylate resin (ARONIX (trademark) M7100 produced by TOA GOSEI CO., LTD.), 5.00 parts of dipentaerythritol hexaacrylate (KAYARAD (trademark) DPHA, produced by Nippon Kayaku Co., Ltd.), 1.00 part of benzophenone (KAYACURE (trademark) BP-100, produced by Nippon Kayaku Co., Ltd.), and 13.5 parts of UKAR ESTER EEP were stirred. The resulting mixture was filtered through a filter with a 1.0 μm pore size. As a result, a red pigment color composition 1 was obtained.

[Red Pigment Color Composition 2]

A red pigment color composition 2 was obtained as described above except that 6 parts of the red pigment 1, 2 parts of a red pigment 2 (C.I. Pigment Red 177, FASTOGEN SUPER RED ATY-TR produced by DIC Corporation), and 2 parts of a yellow pigment 2 (C.I. Pigment Yellow 139), were used instead of 10 parts of the red pigment 1 of the red pigment color composition 1.

[Green Pigment Color Composition 1]

A green pigment color composition 1 was obtained as described above except that 10 parts of a green pigment 1 (halogenated aluminum phthalocyanine (AlClPcBr14ClH)) was used instead of 10 parts of the red pigment 1 of the red pigment color composition 1.

[Green Pigment Color Composition 2]

A green pigment color composition 2 was obtained as described above except that 10 parts of a green pigment 2 (halogenated zinc phthalocyanine (ZnPcBr14ClH)) was used instead of 10 parts of the green pigment 1 of the green pigment color composition 1.

[Green Pigment Color Composition 3]

A green pigment color composition 3 was obtained as described above except that 6 parts of a green pigment 3 (C.I. Pigment Green 58, FASTOGEN GREEN A110 produced by DIC Corporation) and 4 parts of a yellow pigment 1 (C.I. Pigment Yellow 150, FANCHON FAST YELLOW E4GN produced by LANXESS) were used instead of 10 parts of the green pigment 1 of the green pigment color composition 1.

[Green Pigment Color Composition 4]

A green pigment color composition 4 was obtained as described above except that 4 parts of a green pigment 4 (C.I. Pigment Green 58, FASTOGEN GREEN A310 produced by DIC corporation) and 6 parts of a yellow pigment 3 (C.I. Pigment YELLOW 138) were used instead of 6 parts of the green pigment 3 and 4 parts of the yellow pigment 1 of the green pigment color composition 3.

[Blue Pigment Color Composition 1]

A blue pigment color composition 1 was obtained as described above except that 9 parts of a blue pigment 1 (C.I. Pigment Blue 15:6, "FASTOGEN BLUE EP-210" produced by DIC corporation) and 1 part of a purple pigment 1 (C.I. Pigment VIOLET 23) were used instead of 10 parts of the red pigment 1 of the red pigment color composition 1.

[Blue Pigment/Dye Color Composition 2]

A blue pigment/dye color composition 2 was obtained as described above except that 1 part of a purple dye 1 (C.I. Basic Violet 10) was used instead of the purple pigment 1 of the blue pigment color composition 1.

[Yellow Pigment Color Composition 1]

A yellow pigment color composition 1 was obtained as described above except that 10 parts of a yellow pigment 1 (C.I. Pigment Yellow 150, FANCHON FAST YELLOW E4GN produced by LANXESS) was used instead of 10 parts of the red pigment 1 of the red pigment color composition 1.

[Production of Color Filter]

A red color composition was applied to a glass substrate, on which a black matrix had been formed in advance, by spin-coating so as to form a film having a thickness of 2 μm. The film was dried at 70° C. for 20 minutes and subjected to stripe pattern exposure through a photomask with an ultraviolet ray using an exposing machine equipped with an ultra high pressure mercury lamp. Spray development was performed with an alkaline developer for 90 seconds and the substrate was washed with ion exchange water and air-dried. The substrate was subjected to post baking at 230° C. for 30 minutes in a clean oven so as to form red pixels constituting a stripe-shaped color layer on the transparent substrate.

Next, a green color composition was applied to the substrate by spin coating in the same manner to form a film having a thickness of 2 μm. After the film was dried, a stripe-shaped color layer was formed by using an exposure machine through exposure and development at a position that did not overlap the red pixels. As a result, green pixels were formed next to the red pixels.

Next, a blue color composition was applied to the substrate by spin coating in the same manner so as to form blue pixels 2 μm in thickness and adjacent to the red pixels and the green pixels. As a result, a color filter that includes pixels of three colors, red, green and blue, arranged in a stripe pattern was obtained.

As needed, a yellow color composition was applied by spin coating in the same manner to form blue pixels 2 μm in thickness adjacent to the red pixels and the green pixels. As a result, a color filter that includes pixels of four colors, red, green, blue, and yellow, arranged in a stripe pattern was obtained.

Color filters 1 to 4 and comparative color filter 1 were prepared by using dye color compositions and pigment color compositions shown in Table 1.

TABLE 1

| | Color filter 1 | Color filter 2 | Color filter 3 | Color filter 4 | Comparative color filter 1 |
|---|---|---|---|---|---|
| R pixel portion | Red dye color composition 1 | Red dye color composition 2 | Red pigment color composition 1 | Red pigment color composition 2 | Red dye color composition 3 |
| G pixel portion | Green pigment color composition 1 | Green pigment color composition 2 | Green pigment color composition 3 | Green pigment color composition 4 | Green dye color composition 1 |
| B pixel portion | Blue dye color composition 1 | Blue dye color composition 2 | Blue pigment color composition 1 | Blue pigment/dye color composition 2 | Blue dye color composition 3 |
| Y pixel portion | Not formed | Yellow dye color composition 1 | Not formed | Yellow pigment color composition 1 | Yellow dye color composition 2 |

The x value and y value of each pixel portion of the color filter were measured under a C illuminant in the CIE 1931 XYZ colorimetric system by using a microscope MX-50 produced by Olympus Corporation and a spectrophotometer, MCPD-3000 microspectroscope, produced by Otsuka Electronics Co., Ltd. The results are shown in the table below.

TABLE 2

|  | Color filter 1 (x, y) | Color filter 2 (x, y) | Color filter 3 (x, y) | Color filter 4 (x, y) | Comparative color filter 1 (x, y) |
|---|---|---|---|---|---|
| R pixel portion | (0.63, 0.29) | (0.62, 0.31) | (0.62, 0.32) | (0.63, 0.33) | (0.59, 0.30) |
| G pixel portion | (0.26, 0.64) | (0.22, 0.66) | (0.24, 0.72) | (0.20, 0.70) | (0.20, 0.55) |
| B pixel portion | (0.17, 0.10) | (0.13, 0.14) | (0.14, 0.10) | (0.15, 0.07) | (0.14, 0.15) |
| Y pixel portion |  | (0.47, 0.51) |  | (0.48, 0.50) | (0.49, 0.48) |

Examples 1 to 4

An electrode structure was formed on a first substrate and a second substrate. A vertical alignment film was formed on each of the surfaces of the substrates that face each other and subjected to weak rubbing. A VA cell was formed and a liquid crystal composition 1 described below was held between the first substrate and the second substrate. The physical property values of the liquid crystal composition 1 are shown in Table 3. Liquid crystal display devices of Examples 1 to 4 were then formed by using the color filters 1 to 4 shown in Table 1 ($d_{gap}$=3.5 μm, alignment film: SE-5300). VHR and ID of each liquid crystal display device obtained were measured. Image sticking evaluation of the obtained liquid crystal display devices was also performed. The results are shown in Table 4.

[Chem. 20]

Liquid crystal composition 1

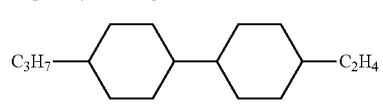

24% 3CyCy2

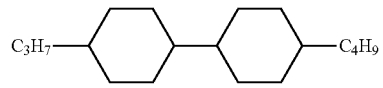

10% 3CyCy4

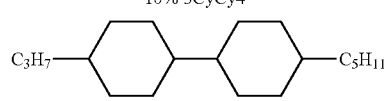

5% 3CyCy5

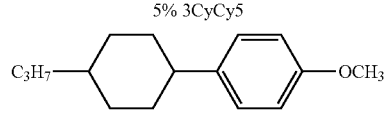

2% 3CyPhO1

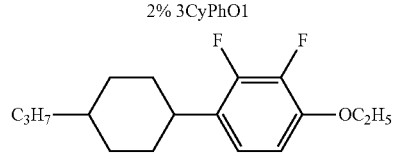

13% 3CyPh5O2

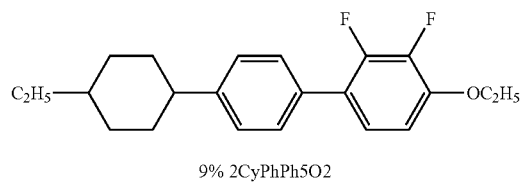

9% 2CyPhPh5O2

-continued

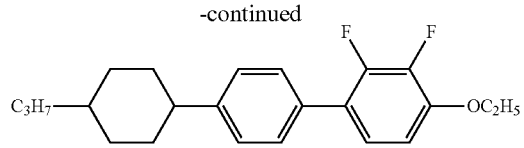

9% 3CyPhPh5O2

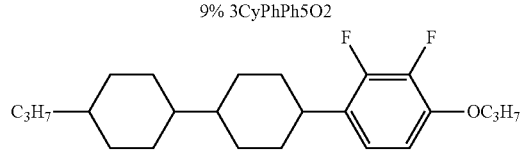

5% 3CyCyPh5O3

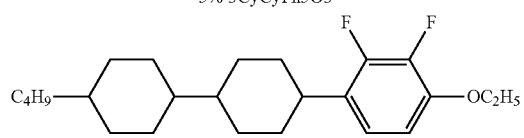

6% 4CyCyPh5O2

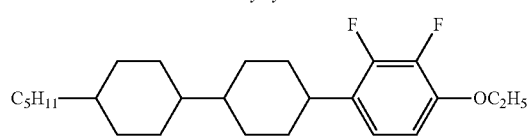

5% 5CyCyPh5O2

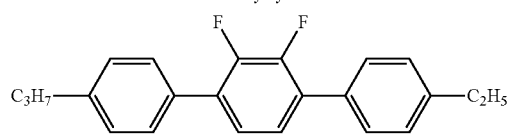

6% 3PhPh5Ph2

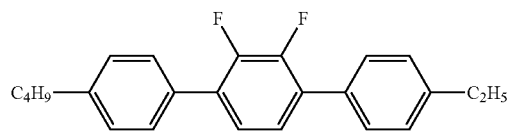

6% 4PhPh5Ph2

TABLE 3

| Liquid crystal composition 1 | |
|---|---|
| $T_{NI}$/° C. | 81.0 |
| Δn | 0.103 |
| no | 1.483 |
| $\epsilon_{\parallel}$ | 3.3 |
| $\epsilon_{\perp}$ | 6.2 |
| Δε | −2.9 |
| η/mPa·s | 20.3 |
| $\gamma_1$/mPa·s | 112 |
| $\gamma_1/\Delta n^2 \times 10^{-2}$ | 105 |

TABLE 4

|  | Example 1 | Example 2 | Example 3 | Example 4 |
| --- | --- | --- | --- | --- |
| Liquid crystal composition | Liquid crystal composition 1 | Liquid crystal composition 1 | Liquid crystal composition 1 | Liquid crystal composition 1 |
| Color filter | Color filter 1 | Color filter 2 | Color filter 3 | Color filter 4 |
| VHR | 99.0 | 99.4 | 99.6 | 99.6 |
| ID | 79 | 50 | 14 | 16 |
| Image sticking | B | A | A | A |

The liquid crystal composition 1 was found to have a liquid crystal layer temperature range of 81° C. which is suitable for practical application as the liquid crystal composition for televisions, a large absolute value of the dielectric anisotropy, a low viscosity, and an optimum Δn.

The liquid crystal display devices of Examples 1 to 4 realized a high VHR and a low ID. In image sticking evaluation, retained images were not observed or were faint and at an acceptable level if any retained image was observed at all.

Examples 5 to 12

The liquid crystal compositions shown in Table 5 were held between substrates as in Example 1 and liquid crystal display devices of Examples 5 to 12 were prepared by using the color filters shown in Table 1. The VHR and ID were measured. Image sticking evaluation of the obtained liquid crystal display devices was also performed. The results are shown in Tables 6 and 7.

TABLE 5

| Liquid crystal composition 2 | | Liquid crystal composition 3 | |
| --- | --- | --- | --- |
| $T_{NI}/°$ C. | 76.0 | $T_{NI}/°$ C. | 84.8 |
| Δn | 0.103 | Δn | 0.103 |
| no | 1.484 | no | 1.484 |
| $\epsilon_\parallel$ | 3.3 | $\epsilon_\parallel$ | 3.2 |
| $\epsilon_\perp$ | 6.3 | $\epsilon_\perp$ | 6.1 |
| Δε | −2.9 | Δε | −2.9 |
| η/mPa·s | 19.8 | η/mPa·s | 21.4 |
| $\gamma_1$/mPa·s | 110 | $\gamma_1$/mPa·s | 119 |
| $\gamma_1/\Delta n^2 \times 10^{-2}$ | 103 | $\gamma_1/\Delta n^2 \times 10^{-2}$ | 112 |
| 3CyCy2 | 24% | 3CyCy2 | 24% |
| 3CyCy4 | 10% | 3CyCy4 | 11% |
| 3CyPhO1 | 7% | 3CyPh5O2 | 12% |
| 3CyPh5O2 | 14% | 2CyPhPh5O2 | 5% |
| 2CyPhPh5O2 | 7% | 3CyPhPh5O2 | 6% |
| 3CyPhPh5O2 | 9% | 3CyCyPh5O3 | 8% |
| 3CyCyPh5O3 | 5% | 4CyCyPh5O2 | 8% |
| 4CyCyPh5O2 | 7% | 5CyCyPh5O2 | 8% |
| 5CyCyFh5O2 | 5% | 3PhPh5Ph2 | 6% |
| 3PhPh5Ph2 | 6% | 4PhPh5Ph2 | 6% |
| 4PhPh5Ph2 | 6% | 5PhPh1 | 3% |
|  |  | 3CyCyPh1 | 3% |

TABLE 6

|  | Example 5 | Example 6 | Example 7 | Example 8 |
| --- | --- | --- | --- | --- |
| Liquid crystal composition | Liquid crystal composition 2 | Liquid crystal composition 2 | Liquid crystal composition 2 | Liquid crystal composition 2 |
| Color filter | Color filter 1 | Color filter 2 | Color filter 3 | Color filter 4 |
| VHR | 99.1 | 99.5 | 99.8 | 99.7 |
| ID | 71 | 32 | 12 | 15 |
| Image sticking | B | A | A | A |

TABLE 7

|  | Example 9 | Example 10 | Example 11 | Example 12 |
| --- | --- | --- | --- | --- |
| Liquid crystal composition | Liquid crystal composition 3 | Liquid crystal composition 3 | Liquid crystal composition 3 | Liquid crystal composition 3 |
| Color filter | Color filter 1 | Color filter 2 | Color filter 3 | Color filter 4 |
| VHR | 99.1 | 99.4 | 99.7 | 99.6 |
| ID | 74 | 35 | 17 | 19 |
| Image sticking | B | B | A | A |

The liquid crystal display devices of Examples 5 to 12 realized a high VHR and a low ID. In image sticking evaluation, retained images were not observed or were faint and at an acceptable level if any retained image was observed at all.

Examples 13 to 24

The liquid crystal compositions shown in Table 8 were held between substrates as in Example 1 and the liquid crystal display devices of Examples 13 to 24 were prepared by using the color filters shown in Table 1. The VHR and ID were measured. Image sticking evaluation of the obtained liquid crystal display devices was also performed. The results are shown in Tables 9 to 11.

TABLE 8

| Liquid crystal composition 4 | | Liquid crystal composition 5 | | Liquid crystal composition 6 | |
| --- | --- | --- | --- | --- | --- |
| $T_{NI}/°$ C. | 74.9 | $T_{NI}/°$ C. | 80.2 | $T_{NI}/°$ C. | 85.7 |
| Δn | 0.102 | Δn | 0.105 | Δn | 0.104 |
| no | 1.484 | no | 1.485 | no | 1.484 |
| $\epsilon_\parallel$ | 3.2 | $\epsilon_\parallel$ | 3.2 | $\epsilon_\parallel$ | 3.2 |
| $\epsilon_\perp$ | 6.1 | $\epsilon_\perp$ | 6.1 | $\epsilon_\perp$ | 6.1 |
| Δε | −2.9 | Δε | −2.9 | Δε | −3.0 |
| η/mPa·s | 21.1 | η/mPa·s | 22.7 | η/mPa·s | 22.9 |
| $\gamma_1$/mPa·s | 116 | $\gamma_1$/mPa·s | 124 | $\gamma_1$/mPa·s | 126 |
| $\gamma_1/\Delta n^2 \times 10^{-2}$ | 111 | $\gamma_1/\Delta n^2 \times 10^{-2}$ | 112 | $\gamma_1/\Delta n^2 \times 10^{-2}$ | 116 |
| 3CyCy2 | 22% | 3CyCy2 | 20% | 3CyCy2 | 20% |
| 3CyCy4 | 11% | 3CyCy4 | 10% | 3CyCy4 | 10% |
| 3CyPh5O2 | 7% | 3CyPh5O2 | 7% | 3CyPh5O2 | 7% |
| 3CyPh5O4 | 8% | 3CyPh5O4 | 7% | 3CyPh5O4 | 7% |
| 2CyPhPh5O2 | 6% | 2CyPhPh5O2 | 6% | 2CyPhPh5O2 | 6% |
| 3CyPhPh5O2 | 7% | 3CyPhPh5O2 | 7% | 3CyPhPh5O2 | 7% |
| 3CyCyPh5O3 | 7% | 3CyCyPh5O3 | 7% | 3CyCyPh5O3 | 7% |
| 4CyCyPh5O2 | 7% | 4CyCyPh5O2 | 8% | 4CyCyPh5O2 | 8% |

TABLE 8-continued

| Liquid crystal composition 4 | | Liquid crystal composition 5 | | Liquid crystal composition 6 | |
|---|---|---|---|---|---|
| 5CyCyPh5O2 | 7% | 5CyCyPh5O2 | 7% | 5CyCyPh5O2 | 7% |
| 3PhPh5Ph2 | 4% | 3PhPh5Ph2 | 4% | 3PhPh5Ph2 | 4% |
| 4PhPh5Ph2 | 4% | 4PhPh5Ph2 | 4% | 4PhPh5Ph2 | 4% |
| 5PhPh1 | 8% | 5PhPh1 | 8% | 5PhPh1 | 5% |
| 3CyCyPh1 | 2% | 3CyCyPh1 | 5% | 3CyCyPh1 | 8% |

TABLE 9

| | Example 13 | Example 14 | Example 15 | Example 16 |
|---|---|---|---|---|
| Liquid crystal composition | Liquid crystal composition 4 | Liquid crystal composition 4 | Liquid crystal composition 4 | Liquid crystal composition 4 |
| Color filter | Color filter 1 | Color filter 2 | Color filter 3 | Color filter 4 |
| VHR | 99.1 | 99.5 | 99.6 | 99.7 |
| ID | 68 | 39 | 21 | 12 |
| Image sticking | B | A | A | A |

TABLE 10

| | Example 17 | Example 18 | Example 19 | Example 20 |
|---|---|---|---|---|
| Liquid crystal composition | Liquid crystal composition 5 | Liquid crystal composition 5 | Liquid crystal composition 5 | Liquid crystal composition 5 |
| Color filter | Color filter 1 | Color filter 2 | Color filter 3 | Color filter 4 |
| VHR | 99.2 | 99.5 | 99.7 | 99.7 |
| ID | 70 | 23 | 14 | 15 |
| Image sticking | B | A | A | A |

TABLE 11

| | Example 21 | Example 22 | Example 23 | Example 24 |
|---|---|---|---|---|
| Liquid crystal composition | Liquid crystal composition 6 | Liquid crystal composition 6 | Liquid crystal composition 6 | Liquid crystal composition 6 |
| Color filter | Color filter 1 | Color filter 2 | Color filter 3 | Color filter 4 |
| VHR | 99.1 | 99.4 | 99.7 | 99.6 |
| ID | 69 | 44 | 15 | 18 |
| Image sticking | B | B | A | A |

The liquid crystal display devices of Examples 13 to 24 realized a high VHR and a low ID. In image sticking evaluation, retained images were not observed or were faint and at an acceptable level if any retained image was observed at all.

Examples 25 to 36

The liquid crystal compositions shown in Table 12 were held between substrates as in Example 1 and the liquid crystal display devices of Examples 25 to 36 were prepared by using the color filters shown in Table 1. The VHR and ID were measured. Image sticking evaluation of the obtained liquid crystal display devices was also performed. The results are shown in Tables 13 to 15.

TABLE 12

| Liquid crystal composition 7 | | Liquid crystal composition 8 | | Liquid crystal composition 9 | |
|---|---|---|---|---|---|
| $T_{NI}/°C$ | 75.1 | $T_{NI}/°C$ | 80.4 | $T_{NI}/°C$ | 85.1 |
| $\Delta n$ | 0.103 | $\Delta n$ | 0.103 | $\Delta n$ | 0.103 |
| $n_o$ | 1.484 | $n_o$ | 1.485 | $n_o$ | 1.484 |
| $\epsilon_\parallel$ | 3.3 | $\epsilon_\parallel$ | 3.3 | $\epsilon_\parallel$ | 3.2 |
| $\epsilon_\perp$ | 5.9 | $\epsilon_\perp$ | 5.9 | $\epsilon_\perp$ | 5.8 |
| $\Delta\epsilon$ | -2.6 | $\Delta\epsilon$ | -2.6 | $\Delta\epsilon$ | -2.6 |
| $\eta$/mPa·s | 20.5 | $\eta$/mPa·s | 21.6 | $\eta$/mPa·s | 22.7 |
| $\gamma_1$/mPa·s | 117 | $\gamma_1$/mPa·s | 125 | $\gamma_1$/mPa·s | 130 |
| $\gamma_1/\Delta n^2 \times 10^{-2}$ | 110 | $\gamma_1/\Delta n^2 \times 10^{-2}$ | 117 | $\gamma_1/\Delta n^2 \times 10^{-2}$ | 122 |
| 3CyCy2 | 15% | 3CyCy2 | 15% | 3CyCy2 | 10% |
| 3CyCy4 | 12% | 3CyCy4 | 12% | 3CyCy4 | 15% |
| 3CyCy5 | 7% | 3CyCy5 | 7% | 3CyCy5 | 12% |
| 3CyPhO1 | 12% | 3CyPhO1 | 12% | 3CyPhO1 | 9% |
| 3CyPh5O2 | 6% | 3CyPh5O2 | 5% | 3CyPh5O2 | 5% |
| 3CyPh5O4 | 7% | 3CyPh5O4 | 5% | 3CyPh5O4 | 5% |
| 2CyPhPh5O2 | 11% | 2CyPhPh5O2 | 11% | 2CyPhPh5O2 | 11% |
| 3CyPhPh5O2 | 12% | 3CyPhPh5O2 | 11% | 3CyPhPh5O2 | 11% |
| 3CyCyPh5O3 | 3% | 3CyCyPh5O3 | 4% | 3CyCyPh5O3 | 4% |
| 4CyCyPh5O2 | 4% | 4CyCyPh5O2 | 6% | 4CyCyPh5O2 | 6% |
| 5CyCyPh5O2 | 3% | 5CyCyPh5O2 | 4% | 5CyCyPh5O2 | 4% |
| 3PhPh5Ph2 | 4% | 3PhPh5Ph2 | 4% | 3PhPh5Ph2 | 4% |
| 4PhPh5Ph2 | 4% | 4PhPh5Ph2 | 4% | 4PhPh5Ph2 | 4% |

TABLE 13

|  | Example 25 | Example 26 | Example 27 | Example 28 |
|---|---|---|---|---|
| Liquid crystal composition | Liquid crystal composition 7 | Liquid crystal composition 7 | Liquid crystal composition 7 | Liquid crystal composition 7 |
| Color filter | Color filter 1 | Color filter 2 | Color filter 3 | Color filter 4 |
| VHR | 99.1 | 99.4 | 99.7 | 99.6 |
| ID | 82 | 47 | 20 | 19 |
| Image sticking | B | B | A | A |

The liquid crystal display devices of Examples 25 to 36 realized a high VHR and a low ID. In image sticking evaluation, retained images were not observed or were faint and at an acceptable level if any retained image was observed at all.

Examples 37 to 48

The liquid crystal compositions shown in Table 16 were held between substrates as in Example 1 and the liquid crystal display devices of Examples 37 to 48 were prepared by using the color filters shown in Table 1. The VHR and ID were measured. Image sticking evaluation of the obtained liquid crystal display devices was also performed. The results are shown in Tables 17 to 19.

TABLE 16

| Liquid crystal composition 10 | | Liquid crystal composition 11 | | Liquid crystal composition 12 | |
|---|---|---|---|---|---|
| $T_{NI}/°C$ | 76.6 | $T_{NI}/°C$ | 80.2 | $T_{NI}/°C$ | 85.7 |
| $\Delta n$ | 0.106 | $\Delta n$ | 0.102 | $\Delta n$ | 0.101 |
| no | 1.487 | no | 1.485 | no | 1.484 |
| $\epsilon_{\parallel}$ | 3.3 | $\epsilon_{\parallel}$ | 3.2 | $\epsilon_{\parallel}$ | 3.2 |
| $\epsilon_{\perp}$ | 5.8 | $\epsilon_{\perp}$ | 5.8 | $\epsilon_{\perp}$ | 5.9 |
| $\Delta\epsilon$ | −2.6 | $\Delta\epsilon$ | −2.6 | $\Delta\epsilon$ | −2.7 |
| $\eta/mPa \cdot s$ | 22.7 | $\eta/mPa \cdot s$ | 22.0 | $\eta/mPa \cdot s$ | 22.2 |
| $\gamma_1/mPa \cdot s$ | 134 | $\gamma_1/mPa \cdot s$ | 129 | $\gamma_1/mPa \cdot s$ | 131 |
| $\gamma_1/\Delta n^2 \times 10^{-2}$ | 119 | $\gamma_1/\Delta n^2 \times 10^{-2}$ | 124 | $\gamma_1/\Delta n^2 \times 10^{-2}$ | 128 |
| 3CyCy2 | 24% | 3CyCy2 | 24% | 3CyCy2 | 24% |
| 3CyCy4 | 6% | 3CyCy4 | 10% | 3CyCy4 | 10% |
| 3CyPhO1 | 5% | 3CyPhO1 | 4% | 3CyPhO1 | 4% |
| 3CyPh5O4 | 9% | 3CyPh5O4 | 9% | 3CyPh5O4 | 9% |
| 2CyPhPh5O2 | 8% | 2CyPhPh5O2 | 8% | 2CyPhPh5O2 | 8% |
| 3CyPhPh5O2 | 8% | 3CyPhPh5O2 | 8% | 3CyPhPh5O2 | 8% |
| 3CyCyPh5O3 | 7% | 3CyCyPh5O3 | 7% | 3CyCyPh5O3 | 7% |
| 4CyCyPh5O2 | 9% | 4CyCyPh5O2 | 9% | 4CyCyPh5O2 | 9% |
| 5CyCyPh5O2 | 7% | 5CyCyPh5O2 | 7% | 5CyCyPh5O2 | 7% |
| 3PhPh5Ph2 | 4% | 3PhPh5Ph2 | 4% | 3PhPh5Ph2 | 4% |
| 4PhPh5Ph2 | 4% | 4PhPh5Ph2 | 4% | 4PhPh5Ph2 | 4% |
| 5PhPh1 | 9% | 5PhPh1 | 6% | 5PhPh1 | 3% |
|  |  |  |  | 3CyCyPh1 | 3% |

TABLE 14

|  | Example 29 | Example 30 | Example 31 | Example 32 |
|---|---|---|---|---|
| Liquid crystal composition | Liquid crystal composition 8 | Liquid crystal composition 8 | Liquid crystal composition 8 | Liquid crystal composition 8 |
| Color filter | Color filter 1 | Color filter 2 | Color filter 3 | Color filter 4 |
| VHR | 99.0 | 99.5 | 99.8 | 99.7 |
| ID | 89 | 43 | 12 | 12 |
| Image sticking | B | B | A | A |

TABLE 15

|  | Example 33 | Example 34 | Example 35 | Example 36 |
|---|---|---|---|---|
| Liquid crystal composition | Liquid crystal composition 9 | Liquid crystal composition 9 | Liquid crystal composition 9 | Liquid crystal composition 9 |
| Color filter | Color filter 1 | Color filter 2 | Color filter 3 | Color filter 4 |
| VHR | 99.1 | 99.4 | 99.7 | 99.6 |
| ID | 87 | 49 | 17 | 19 |
| Image sticking | B | B | A | A |

TABLE 17

|  | Example 37 | Example 38 | Example 39 | Example 40 |
|---|---|---|---|---|
| Liquid crystal composition | Liquid crystal composition 10 | Liquid crystal composition 10 | Liquid crystal composition 10 | Liquid crystal composition 10 |
| Color filter | Color filter 1 | Color filter 2 | Color filter 3 | Color filter 4 |
| VHR | 99.0 | 99.4 | 99.6 | 99.6 |
| ID | 92 | 46 | 19 | 18 |
| Image sticking | B | A | A | A |

TABLE 18

|  | Example 41 | Example 42 | Example 43 | Example 44 |
|---|---|---|---|---|
| Liquid crystal composition | Liquid crystal composition 11 | Liquid crystal composition 11 | Liquid crystal composition 11 | Liquid crystal composition 11 |
| Color filter | Color filter 1 | Color filter 2 | Color filter 3 | Color filter 4 |
| VHR | 99.2 | 99.5 | 99.8 | 99.7 |
| ID | 89 | 39 | 11 | 12 |
| Image sticking | B | B | A | A |

TABLE 19

|  | Example 45 | Example 46 | Example 47 | Example 48 |
| --- | --- | --- | --- | --- |
| Liquid crystal composition | Liquid crystal composition 12 | Liquid crystal composition 12 | Liquid crystal composition 12 | Liquid crystal composition 12 |
| Color filter | Color filter 1 | Color filter 2 | Color filter 3 | Color filter 4 |
| VHR | 99.2 | 99.5 | 99.8 | 99.7 |
| ID | 88 | 45 | 10 | 14 |
| Image sticking | B | B | A | A |

The liquid crystal display devices of Examples 37 to 48 realized a high VHR and a low ID. In image sticking evaluation, retained images were not observed or were faint and at an acceptable level if any retained image was observed at all.

Examples 49 to 60

The liquid crystal compositions shown in Table 20 were held between substrates as in Example 1 and the liquid crystal display devices of Examples 49 to 60 were prepared by using the color filters shown in Table 1. The VHR and ID were measured. Image sticking evaluation of the obtained liquid crystal display devices was also performed. The results are shown in Tables 21 to 23.

TABLE 20

| Liquid crystal composition 13 | | Liquid crystal composition 14 | | Liquid crystal composition 15 | |
| --- | --- | --- | --- | --- | --- |
| $T_{NI}/°C$ | 75.3 | $T_{NI}/°C$ | 80.3 | $T_{NI}/°C$ | 85.9 |
| $\Delta n$ | 0.105 | $\Delta n$ | 0.106 | $\Delta n$ | 0.107 |
| no | 1.485 | no | 1.486 | no | 1.485 |
| $\epsilon_\parallel$ | 3.3 | $\epsilon_\parallel$ | 3.3 | $\epsilon_\parallel$ | 3.3 |
| $\epsilon_\perp$ | 6.2 | $\epsilon_\perp$ | 6.2 | $\epsilon_\perp$ | 6.3 |
| $\Delta\epsilon$ | −2.9 | $\Delta\epsilon$ | −2.9 | $\Delta\epsilon$ | −3.0 |
| $\eta/mPa·s$ | 20.2 | $\eta/mPa·s$ | 21.4 | $\eta/mPa·s$ | 23.2 |
| $\gamma_1/mPa·s$ | 113 | $\gamma_1/mPa·s$ | 121 | $\gamma_1/mPa·s$ | 129 |
| $\gamma_1/\Delta n^2 \times 10^{-2}$ | 103 | $\gamma_1/\Delta n^2 \times 10^{-2}$ | 107 | $\gamma_1/\Delta n^2 \times 10^{-2}$ | 114 |
| 3CyCy2 | 24% | 3CyCy2 | 23% | 3CyCy2 | 16% |
| 3CyCy4 | 5% | 3CyCy4 | 5% | 3CyCy4 | 9% |
| 3CyPhO1 | 7% | 3CyPhO1 | 7% | 3CyCy5 | 3% |
| 2CyPh5O2 | 9% | 2CyPh5O2 | 8% | 3CyPhO1 | 6% |
| 3CyPh5O4 | 8% | 3CyPh5O4 | 7% | 2CyPh5O2 | 8% |
| 2CyPhPh5O2 | 7% | 2CyPhPh5O2 | 7% | 3CyPh5O4 | 7% |
| 3CyPhPh5O2 | 9% | 3CyPhPh5O2 | 9% | 2CyPhPh5O2 | 7% |
| 3CyCyPh5O3 | 5% | 3CyCyPh5O3 | 5% | 3CyPhPh5O2 | 9% |
| 4CyCyPh5O2 | 5% | 4CyCyPh5O2 | 6% | 3CyCyPh5O3 | 5% |
| 5CyCyPh5O2 | 4% | 5CyCyPh5O2 | 5% | 4CyCyPh5O2 | 6% |
| 3PhPh5Ph2 | 5% | 3PhPh5Ph2 | 5% | 5CyCyPh5O2 | 6% |
| 4PhPh5Ph2 | 6% | 4PhPh5Ph2 | 6% | 3PhPh5Ph2 | 5% |
| 3CyCyPh1 | 6% | 3CyCyPh1 | 7% | 4PhPh5Ph2 | 5% |
|  |  |  |  | 3CyCyPh1 | 8% |

TABLE 21

|  | Example 49 | Example 50 | Example 51 | Example 52 |
| --- | --- | --- | --- | --- |
| Liquid crystal composition | Liquid crystal composition 13 | Liquid crystal composition 13 | Liquid crystal composition 13 | Liquid crystal composition 13 |
| Color filter | Color filter 1 | Color filter 2 | Color filter 3 | Color filter 4 |
| VHR | 99.1 | 99.4 | 99.7 | 99.6 |
| ID | 88 | 48 | 19 | 23 |
| Image sticking | B | B | A | A |

TABLE 22

|  | Example 53 | Example 54 | Example 55 | Example 56 |
| --- | --- | --- | --- | --- |
| Liquid crystal composition | Liquid crystal composition 14 | Liquid crystal composition 14 | Liquid crystal composition 14 | Liquid crystal composition 14 |
| Color filter | Color filter 1 | Color filter 2 | Color filter 3 | Color filter 4 |
| VHR | 99.0 | 99.4 | 99.6 | 99.6 |
| ID | 93 | 50 | 20 | 19 |
| Image sticking | B | B | A | A |

TABLE 23

|  | Example 57 | Example 58 | Example 59 | Example 60 |
| --- | --- | --- | --- | --- |
| Liquid crystal composition | Liquid crystal composition 15 | Liquid crystal composition 15 | Liquid crystal composition 15 | Liquid crystal composition 15 |
| Color filter | Color filter 1 | Color filter 2 | Color filter 3 | Color filter 4 |
| VHR | 99.1 | 99.4 | 99.5 | 99.6 |
| ID | 81 | 49 | 26 | 20 |
| Image sticking | B | A | A | A |

The liquid crystal display devices of Examples 49 to 60 realized a high VHR and a low ID. In image sticking evaluation, retained images were not observed or were faint and at an acceptable level if any retained image was observed at all.

Examples 61 to 72

The liquid crystal compositions shown in Table 24 were held between substrates as in Example 1 and the liquid crystal display devices of Examples 61 to 72 were prepared by using the color filters shown in Table 1. The VHR and ID were measured. Image sticking evaluation of the obtained liquid crystal display devices was also performed. The results are shown in Tables 25 to 27.

TABLE 24

| | Liquid crystal composition 16 | | Liquid crystal composition 17 | | Liquid crystal composition 18 |
|---|---|---|---|---|---|
| $T_{NI}/°C$ | 76.0 | $T_{NI}/°C$ | 81.3 | $T_{NI}/°C$ | 84.7 |
| $\Delta n$ | 0.105 | $\Delta n$ | 0.106 | $\Delta n$ | 0.108 |
| no | 1.484 | no | 1.483 | no | 1.484 |
| $\epsilon_{\parallel}$ | 3.3 | $\epsilon_{\parallel}$ | 3.2 | $\epsilon_{\parallel}$ | 3.2 |
| $\epsilon_{\perp}$ | 6.0 | $\epsilon_{\perp}$ | 6.0 | $\epsilon_{\perp}$ | 6.0 |
| $\Delta\epsilon$ | −2.7 | $\Delta\epsilon$ | −2.8 | $\Delta\epsilon$ | −2.8 |
| $\eta$/mPa·s | 20.6 | $\eta$/mPa·s | 20.7 | $\eta$/mPa·s | 21.7 |
| $\gamma_1$/mPa·s | 118 | $\gamma_1$/mPa·s | 117 | $\gamma_1$/mPa·s | 123 |
| $\gamma_1/\Delta n^2 \times 10^{-2}$ | 106 | $\gamma_1/\Delta n^2 \times 10^{-2}$ | 105 | $\gamma_1/\Delta n^2 \times 10^{-2}$ | 105 |
| 3CyCy2 | 19% | 3CyCy2 | 21% | 3CyCy2 | 19% |
| 3CyCy4 | 12% | 3CyCy4 | 12% | 3CyCy4 | 12% |
| 3CyCy5 | 5% | 3CyCy5 | 5% | 3CyCy5 | 4% |
| 3CyPhO1 | 5% | 2CyPh5O2 | 7% | 2CyPh5O2 | 7% |
| 2CyPh5O2 | 7% | 3CyPh5O4 | 8% | 3CyPh5O4 | 8% |
| 3CyPh5O4 | 8% | 2CyPhPh5O2 | 7% | 2CyPhPh5O2 | 7% |
| 2CyPhPh5O2 | 7% | 3CyPhPh5O2 | 7% | 3CyPhPh5O2 | 7% |
| 3CyPhPh5O2 | 7% | 3CyCyPh5O3 | 5% | 3CyCyPh5O3 | 5% |
| 3CyCyPh5O3 | 5% | 4CyCyPh5O2 | 5% | 4CyCyPh5O2 | 5% |
| 4CyCyPh5O2 | 5% | 5CyCyPh5O2 | 5% | 5CyCyPh5O2 | 5% |
| 5CyCyPh5O2 | 5% | 3PhPh5Ph2 | 7% | 3PhPh5Ph2 | 7% |
| 3PhPh5Ph2 | 7% | 4PhPh5Ph2 | 8% | 4PhPh5Ph2 | 8% |
| 4PhPh5Ph2 | 8% | 3CyCyPh1 | 3% | 3CyCyPh1 | 6% |

TABLE 25

| | Example 61 | Example 62 | Example 63 | Example 64 |
|---|---|---|---|---|
| Liquid crystal composition | Liquid crystal composition 16 | Liquid crystal composition 16 | Liquid crystal composition 16 | Liquid crystal composition 16 |
| Color filter | Color filter 1 | Color filter 2 | Color filter 3 | Color filter 4 |
| VHR | 99.0 | 99.4 | 99.6 | 99.6 |
| ID | 86 | 50 | 26 | 23 |
| Image sticking | B | B | A | A |

TABLE 26

| | Example 65 | Example 66 | Example 67 | Example 68 |
|---|---|---|---|---|
| Liquid crystal composition | Liquid crystal composition 17 | Liquid crystal composition 17 | Liquid crystal composition 17 | Liquid crystal composition 17 |
| Color filter | Color filter 1 | Color filter 2 | Color filter 3 | Color filter 4 |
| VHR | 99.0 | 99.4 | 99.5 | 99.6 |
| ID | 82 | 48 | 28 | 25 |
| Image sticking | B | A | A | A |

TABLE 27

| | Example 69 | Example 70 | Example 71 | Example 72 |
|---|---|---|---|---|
| Liquid crystal composition | Liquid crystal composition 18 | Liquid crystal composition 18 | Liquid crystal composition 18 | Liquid crystal composition 18 |
| Color filter | Color filter 1 | Color filter 2 | Color filter 3 | Color filter 4 |
| VHR | 99.1 | 99.3 | 99.6 | 99.5 |
| ID | 90 | 49 | 23 | 29 |
| Image sticking | B | A | A | A |

The liquid crystal display devices of Examples 61 to 72 realized a high VHR and a low ID. In image sticking evaluation, retained images were not observed or were faint and at an acceptable level if any retained image was observed at all.

Examples 73 to 84

The liquid crystal compositions shown in Table 28 were held between substrates as in Example 1 and the liquid crystal display devices of Examples 73 to 84 were prepared by using the color filters shown in Table 1. The VHR and ID were measured. Image sticking evaluation of the obtained liquid crystal display devices was also performed. The results are shown in Tables 29 to 31.

TABLE 28

| | Liquid crystal composition 19 | | Liquid crystal composition 20 | | Liquid crystal composition 21 |
|---|---|---|---|---|---|
| $T_{NI}/°C$ | 77.1 | $T_{NI}/°C$ | 82.7 | $T_{NI}/°C$ | 86.4 |
| $\Delta n$ | 0.104 | $\Delta n$ | 0.107 | $\Delta n$ | 0.106 |
| no | 1.485 | no | 1.486 | no | 1.485 |
| $\epsilon_{\parallel}$ | 3.5 | $\epsilon_{\parallel}$ | 3.3 | $\epsilon_{\parallel}$ | 3.3 |
| $\epsilon_{\perp}$ | 7.0 | $\epsilon_{\perp}$ | 6.3 | $\epsilon_{\perp}$ | 6.3 |
| $\Delta\epsilon$ | −3.5 | $\Delta\epsilon$ | −3.0 | $\Delta\epsilon$ | −3.0 |
| $\eta$/mPa·s | 25.1 | $\eta$/mPa·s | 24.2 | $\eta$/mPa·s | 24.4 |
| $\gamma_1$/mPa·s | 141 | $\gamma_1$/mPa·s | 141 | $\gamma_1$/mPa·s | 142 |
| $\gamma_1/\Delta n^2 \times 10^{-2}$ | 131 | $\gamma_1/\Delta n^2 \times 10^{-2}$ | 123 | $\gamma_1/\Delta n^2 \times 10^{-2}$ | 126 |
| 3CyCy2 | 22% | 3CyCy2 | 24% | 3CyCy2 | 24% |
| 3CyPhO1 | 14% | 3CyCy4 | 5% | 3CyCy4 | 5% |
| 2CyPh5O2 | 7% | 3CyPhO1 | 6% | 3CyPhO1 | 6% |
| 3CyPh5O4 | 8% | 2CyPh5O2 | 5% | 2CyPh5O2 | 5% |
| 2CyPhPh5O2 | 7% | 3CyPh5O4 | 5% | 3CyPh5O4 | 5% |
| 3CyPhPh5O2 | 9% | 2CyPhPh5O2 | 7% | 2CyPhPh5O2 | 7% |
| 3CyCyPh5O3 | 8% | 3CyPhPh5O2 | 9% | 3CyPhPh5O2 | 9% |
| 4CyCyPh5O2 | 9% | 3CyCyPh5O3 | 8% | 3CyCyPh5O3 | 8% |

TABLE 28-continued

| Liquid crystal composition 19 | | Liquid crystal composition 20 | | Liquid crystal composition 21 | |
|---|---|---|---|---|---|
| 5CyCyPh5O2 | 8% | 4CyCyPh5O2 | 9% | 4CyCyPh5O2 | 9% |
| 3PhPh5Ph2 | 4% | 5CyCyPh5O2 | 8% | 5CyCyPh5O2 | 8% |
| 4PhPh5Ph2 | 4% | 3PhPh5Ph2 | 5% | 3PhPh5Ph2 | 5% |
| | | 4PhPh5Ph2 | 5% | 4PhPh5Ph2 | 5% |
| | | 5PhPh1 | 4% | 5PhPh1 | 2% |
| | | | | 3CyCyPh1 | 2% |

TABLE 29

| | Example 73 | Example 74 | Example 75 | Example 76 |
|---|---|---|---|---|
| Liquid crystal composition | Liquid crystal composition 19 | Liquid crystal composition 19 | Liquid crystal composition 19 | Liquid crystal composition 19 |
| Color filter | Color filter 1 | Color filter 2 | Color filter 3 | Color filter 4 |
| VHR | 99.1 | 99.4 | 99.6 | 99.6 |
| ID | 94 | 53 | 18 | 17 |
| Image sticking | B | A | A | A |

TABLE 30

| | Example 77 | Example 78 | Example 79 | Example 80 |
|---|---|---|---|---|
| Liquid crystal composition | Liquid crystal composition 20 | Liquid crystal composition 20 | Liquid crystal composition 20 | Liquid crystal composition 20 |
| Color filter | Color filter 1 | Color filter 2 | Color filter 3 | Color filter 4 |
| VHR | 99.2 | 99.5 | 99.7 | 99.6 |
| ID | 70 | 32 | 13 | 15 |
| Image sticking | B | A | A | A |

TABLE 31

| | Example 81 | Example 82 | Example 83 | Example 84 |
|---|---|---|---|---|
| Liquid crystal composition | Liquid crystal composition 21 | Liquid crystal composition 21 | Liquid crystal composition 21 | Liquid crystal composition 21 |
| Color filter | Color filter 1 | Color filter 2 | Color filter 3 | Color filter 4 |
| VHR | 99.0 | 99.4 | 99.5 | 99.6 |
| ID | 88 | 52 | 30 | 27 |
| Image sticking | B | B | A | A |

The liquid crystal display devices of Examples 73 to 84 realized a high VHR and a low ID. In image sticking evaluation, retained images were not observed or were faint and at an acceptable level if any retained image was observed at all.

Examples 85 to 96

The liquid crystal compositions shown in Table 32 were held between substrates as in Example 1 and the liquid crystal display devices of Examples 85 to 96 were prepared by using the color filters shown in Table 1. The VHR and ID were measured. Image sticking evaluation of the obtained liquid crystal display devices was also performed. The results are shown in Tables 33 to 35.

TABLE 32

| Liquid crystal composition 22 | | Liquid crystal composition 23 | | Liquid crystal composition 24 | |
|---|---|---|---|---|---|
| $T_{NI}/°C$ | 75.5 | $T_{NI}/°C$ | 80.3 | $T_{NI}/°C$ | 85.0 |
| $\Delta n$ | 0.102 | $\Delta n$ | 0.101 | $\Delta n$ | 0.102 |
| no | 1.484 | no | 1.484 | no | 1.484 |
| $\epsilon_\parallel$ | 3.3 | $\epsilon_\parallel$ | 3.3 | $\epsilon_\parallel$ | 3.3 |
| $\epsilon_\perp$ | 6.1 | $\epsilon_\perp$ | 6.2 | $\epsilon_\perp$ | 6.2 |
| $\Delta\epsilon$ | −2.8 | $\Delta\epsilon$ | −2.9 | $\Delta\epsilon$ | −3.0 |
| $\eta$/mPa·s | 22.2 | $\eta$/mPa·s | 22.0 | $\eta$/mPa·s | 22.7 |
| $\gamma_1$/mPa·s | 121 | $\gamma_1$/mPa·s | 118 | $\gamma_1$/mPa·s | 122 |
| $\gamma_1/\Delta n^2 \times 10^{-2}$ | 117 | $\gamma_1/\Delta n^2 \times 10^{-2}$ | 117 | $\gamma_1/\Delta n^2 \times 10^{-2}$ | 118 |
| 3CyCy2 | 14% | 3CyCy2 | 17% | 3CyCy2 | 16% |
| 3CyCy4 | 12% | 3CyCy4 | 12% | 3CyCy4 | 12% |
| 3CyCy5 | 5% | 3CyCy5 | 5% | 3CyCy5 | 5% |
| 3CyPhO1 | 7% | 3CyPhO1 | 6% | 3CyPhO1 | 5% |
| 2CyPh5O2 | 7% | 2CyPh5O2 | 12% | 2CyPh5O2 | 12% |
| 3CyPh5O4 | 7% | 2CyPhPh5O2 | 9% | 2CyPhPh5O2 | 9% |
| 2CyPhPh5O2 | 8% | 3CyPhPh5O2 | 9% | 3CyPhPh5O2 | 9% |
| 3CyPhPh5O2 | 8% | 3CyCyPh5O3 | 6% | 3CyCyPh5O3 | 6% |
| 3CyCyPh5O3 | 6% | 4CyCyPh5O2 | 8% | 4CyCyPh5O2 | 8% |
| 4CyCyPh5O2 | 7% | 5CyCyPh5O2 | 6% | 5CyCyPh5O2 | 6% |
| 5CyCyPh5O2 | 6% | 3PhPh5Ph2 | 3% | 3PhPh5Ph2 | 3% |
| 3PhPh5Ph2 | 3% | 4PhPh5Ph2 | 3% | 4PhPh5Ph2 | 3% |
| 4PhPh5Ph2 | 3% | 5PhPh1 | 4% | 5PhPh1 | 3% |
| 5PhPh1 | 6% | | | 3CyCyPh1 | 3% |
| 3CyCyPh1 | 1% | | | | |

TABLE 33

|  | Example 85 | Example 86 | Example 87 | Example 88 |
|---|---|---|---|---|
| Liquid crystal composition | Liquid crystal composition 22 | Liquid crystal composition 22 | Liquid crystal composition 22 | Liquid crystal composition 22 |
| Color filter | Color filter 1 | Color filter 2 | Color filter 3 | Color filter 4 |
| VHR | 99.1 | 99.4 | 99.6 | 99.6 |
| ID | 78 | 49 | 22 | 24 |
| Image sticking | B | B | A | A |

TABLE 34

|  | Example 89 | Example 90 | Example 91 | Example 92 |
|---|---|---|---|---|
| Liquid crystal composition | Liquid crystal composition 23 | Liquid crystal composition 23 | Liquid crystal composition 23 | Liquid crystal composition 23 |
| Color filter | Color filter 1 | Color filter 2 | Color filter 3 | Color filter 4 |
| VHR | 99.1 | 99.4 | 99.6 | 99.5 |
| ID | 85 | 51 | 26 | 31 |
| Image sticking | B | A | A | A |

TABLE 35

|  | Example 93 | Example 94 | Example 95 | Example 96 |
|---|---|---|---|---|
| Liquid crystal composition | Liquid crystal composition 24 | Liquid crystal composition 24 | Liquid crystal composition 24 | Liquid crystal composition 24 |
| Color filter | Color filter 1 | Color filter 2 | Color filter 3 | Color filter 4 |
| VHR | 99.1 | 99.5 | 99.8 | 99.7 |
| ID | 66 | 33 | 11 | 18 |
| Image sticking | A | A | A | A |

The liquid crystal display devices of Examples 85 to 96 realized a high VHR and a low ID. In image sticking evaluation, retained images were not observed or were faint and at an acceptable level if any retained image was observed at all.

Examples 97 to 108

The liquid crystal compositions shown in Table 36 were held between substrates as in Example 1 and the liquid crystal display devices of Examples 97 to 108 were prepared by using the color filters shown in Table 1. The VHR and ID were measured. Image sticking evaluation of the obtained liquid crystal display devices was also performed. The results are shown in Tables 37 to 39.

TABLE 36

| Liquid crystal composition 25 | | Liquid crystal composition 26 | | Liquid crystal composition 27 | |
|---|---|---|---|---|---|
| $T_{NI}/°C$ | 75.6 | $T_{NI}/°C$ | 81.1 | $T_{NI}/°C$ | 85.7 |
| $\Delta n$ | 0.104 | $\Delta n$ | 0.105 | $\Delta n$ | 0.105 |
| no | 1.484 | no | 1.484 | no | 1.484 |
| $\epsilon_\parallel$ | 3.3 | $\epsilon_\parallel$ | 3.3 | $\epsilon_\parallel$ | 3.2 |
| $\epsilon_\perp$ | 6.1 | $\epsilon_\perp$ | 6.1 | $\epsilon_\perp$ | 6.1 |
| $\Delta\epsilon$ | −2.8 | $\Delta\epsilon$ | −2.8 | $\Delta\epsilon$ | −2.9 |
| $\eta/mPa\cdot s$ | 20.2 | $\eta/mPa\cdot s$ | 20.8 | $\eta/mPa\cdot s$ | 21.0 |
| $\gamma_1/mPa\cdot s$ | 117 | $\gamma_1/mPa\cdot s$ | 119 | $\gamma_1/mPa\cdot s$ | 92 |
| $\gamma_1/\Delta n^2 \times 10^{-2}$ | 107 | $\gamma_1/\Delta n^2 \times 10^{-2}$ | 107 | $\gamma_1/\Delta n^2 \times 10^{-2}$ | 82 |
| 3CyCy2 | 25% | 3CyCy2 | 25% | 3CyCy2 | 25% |
| 3CyCy4 | 10% | 3CyCy4 | 10% | 3CyCy4 | 12% |
| 3CyPhO1 | 4% | 3CyPhO1 | 4% | 2CyPh5O2 | 12% |
| 2CyPh5O2 | 7% | 2CyPh5O2 | 12% | 2CyPhPh5O2 | 5% |
| 3CyPh5O4 | 8% | 2CyPhPh5O2 | 5% | 3CyPhPh5O2 | 6% |
| 2CyPhPh5O2 | 5% | 3CyPhPh5O2 | 6% | 3CyCyPh5O3 | 7% |
| 3CyPhPh5O2 | 6% | 3CyCyPh5O3 | 7% | 4CyCyPh5O2 | 8% |
| 3CyCyPh5O3 | 6% | 4CyCyPh5O2 | 8% | 5CyCyPh5O2 | 7% |
| 4CyCyPh5O2 | 7% | 5CyCyPh5O2 | 7% | 3PhPh5Ph2 | 8% |
| 5CyCyPh5O2 | 6% | 3PhPh5Ph2 | 8% | 4PhPh5Ph2 | 8% |
| 3PhPh5Ph2 | 8% | 4PhPh5Ph2 | 8% | 3CyCyPh1 | 2% |
| 4PhPh5Ph2 | 8% | | | | |

TABLE 37

|  | Example 97 | Example 98 | Example 99 | Example 100 |
|---|---|---|---|---|
| Liquid crystal composition | Liquid crystal composition 25 | Liquid crystal composition 25 | Liquid crystal composition 25 | Liquid crystal composition 25 |
| Color filter | Color filter 1 | Color filter 2 | Color filter 3 | Color filter 4 |
| VHR | 99.3 | 99.6 | 99.8 | 99.7 |
| ID | 54 | 30 | 12 | 19 |
| Image sticking | B | A | A | A |

TABLE 38

|  | Example 101 | Example 102 | Example 103 | Example 104 |
|---|---|---|---|---|
| Liquid crystal composition | Liquid crystal composition 26 | Liquid crystal composition 26 | Liquid crystal composition 26 | Liquid crystal composition 26 |
| Color filter | Color filter 1 | Color filter 2 | Color filter 3 | Color filter 4 |
| VHR | 99.2 | 99.4 | 99.6 | 99.6 |
| ID | 77 | 52 | 27 | 25 |
| Image sticking | B | A | A | A |

TABLE 39

|  | Example 105 | Example 106 | Example 107 | Example 108 |
|---|---|---|---|---|
| Liquid crystal | Liquid crystal | Liquid crystal | Liquid crystal | Liquid crystal |

TABLE 39-continued

|  | Example 105 | Example 106 | Example 107 | Example 108 |
|---|---|---|---|---|
| composition | composition 27 | composition 27 | composition 27 | composition 27 |
| Color filter | Color filter 1 | Color filter 2 | Color filter 3 | Color filter 4 |
| VHR | 99.1 | 99.4 | 99.6 | 99.5 |
| ID | 75 | 47 | 19 | 23 |
| Image sticking | B | B | A | A |

The liquid crystal display devices of Examples 97 to 108 realized a high VHR and a low ID. In image sticking evaluation, retained images were not observed or were faint and at an acceptable level if any retained image was observed at all.

Examples 109 to 112

The liquid crystal composition 1 was mixed with 0.3 mass % of 2-methyl-acrylic acid 4'-{2-[4-(2-acryloyloxy-ethyl)-phenoxycarbonyl]-ethyl}-biphenyl-4-yl ester to prepare a liquid crystal composition 28. The liquid crystal composition 28 was held in the VA cell used in Example 1 and irradiated with ultraviolet light for 600 seconds (3.0 J/cm$^2$) while applying a drive voltage between the electrodes to perform polymerization. Then liquid crystal display devices of Examples 109 to 112 were prepared by using the color filters 1 to 4 shown in Table 1 and the VHR and ID of the devices were measured. Image sticking evaluation was conducted on the liquid crystal display devices. The results are shown in Table 40.

TABLE 40

|  | Example 109 | Example 110 | Example 111 | Example 112 |
|---|---|---|---|---|
| Liquid crystal composition | Liquid crystal composition 28 | Liquid crystal composition 28 | Liquid crystal composition 28 | Liquid crystal composition 28 |
| Color filter | Color filter 1 | Color filter 2 | Color filter 3 | Color filter 4 |
| VHR | 99.0 | 99.4 | 99.5 | 99.5 |
| ID | 86 | 46 | 22 | 26 |
| Image sticking | B | B | A | A |

The liquid crystal display devices of Examples 109 to 112 realized a high VHR and a low ID. In image sticking evaluation, retained images were not observed or were faint and at an acceptable level if any retained image was observed at all.

Examples 113 to 116

The liquid crystal composition 13 was mixed with 0.3 mass % of bismethacrylic acid biphenyl-4,4'-diyl to prepare a liquid crystal composition 29. The liquid crystal composition 29 was held in the VA cell used in Example 1 and irradiated with ultraviolet light for 600 seconds (3.0 J/cm$^2$) while applying a drive voltage between the electrodes to perform polymerization. Then liquid crystal display devices of Examples 113 to 116 were prepared by using the color filters 1 to 4 shown in Table 1 and the VHR and ID of the devices were measured. Image sticking evaluation was conducted on the liquid crystal display devices. The results are shown in Table 41.

TABLE 41

|  | Example 113 | Example 114 | Example 115 | Example 116 |
|---|---|---|---|---|
| Liquid crystal composition | Liquid crystal composition 29 | Liquid crystal composition 29 | Liquid crystal composition 29 | Liquid crystal composition 29 |
| Color filter | Color filter 1 | Color filter 2 | Color filter 3 | Color filter 4 |
| VHR | 99.1 | 99.4 | 99.5 | 99.6 |
| ID | 79 | 53 | 20 | 18 |
| Image sticking | B | B | A | A |

The liquid crystal display devices of Examples 113 to 116 realized a high VHR and a low ID. In image sticking evaluation, retained images were not observed or were faint and at an acceptable level if any retained image was observed at all.

Examples 117 to 120

The liquid crystal composition 19 was mixed with 0.3 mass % of bismethacrylic acid 3-fluorobiphenyl-4,4'-diyl to prepare a liquid crystal composition 30. The liquid crystal composition 30 was held in the VA cell used in Example 1 and irradiated with ultraviolet light for 600 seconds (3.0 J/cm$^2$) while applying a drive voltage between the electrodes to perform polymerization. Then liquid crystal display devices of Examples 117 to 120 were prepared by using the color filters 1 to 4 shown in Table 1 and the VHR and ID of the devices were measured. Image sticking evaluation was conducted on the liquid crystal display devices. The results are shown in Table 42.

TABLE 42

|  | Example 117 | Example 118 | Example 119 | Example 120 |
|---|---|---|---|---|
| Liquid crystal composition | Liquid crystal composition 30 | Liquid crystal composition 30 | Liquid crystal composition 30 | Liquid crystal composition 30 |
| Color filter | Color filter 1 | Color filter 2 | Color filter 3 | Color filter 4 |
| VHR | 99.0 | 99.4 | 99.6 | 99.5 |
| ID | 82 | 49 | 18 | 25 |
| Image sticking | B | A | A | A |

The liquid crystal display devices of Examples 117 to 120 realized a high VHR and a low ID. In image sticking evaluation, retained images were not observed or were faint and at an acceptable level if any retained image was observed at all.

Comparative Examples 25 to 36

Comparative liquid crystal compositions shown in Table 52 were held in VA cells as in Example 1. Liquid crystal display devices of Comparative Examples 25 to 36 were prepared by using the color filters 1 to 4 shown in Table 1 and the VHR and ID of the devices were measured. Image sticking evaluation was conducted on the liquid crystal display devices. The results are shown in Tables 53 to 55.

TABLE 52

| | Comparative liquid crystal composition 7 | | Comparative liquid crystal composition 8 | | Comparative liquid crystal composition 9 |
|---|---|---|---|---|---|
| $T_{NI}/°C.$ | 75.5 | $T_{NI}/°C.$ | 80.7 | $T_{NI}/°C.$ | 85.8 |
| $\Delta n$ | 0.104 | $\Delta n$ | 0.104 | $\Delta n$ | 0.104 |
| no | 1.485 | no | 1.485 | no | 1.485 |
| $\epsilon_{//}$ | 3.26 | $\epsilon_{//}$ | 3.22 | $\epsilon_{//}$ | 3.21 |
| $\epsilon_{\perp}$ | 6.14 | $\epsilon_{\perp}$ | 6.10 | $\epsilon_{\perp}$ | 6.16 |
| $\Delta\epsilon$ | −2.88 | $\Delta\epsilon$ | −2.88 | $\Delta\epsilon$ | −2.95 |
| $\eta/mPa·s$ | 22.5 | $\eta/mPa·s$ | 22.3 | $\eta/mPa·s$ | 22.4 |
| $\gamma_1/mPa·s$ | 123 | $\gamma_1/mPa·s$ | 122 | $\gamma_1/mPa·s$ | 124 |
| $\gamma_1/\Delta n^2 \times 10^{-2}$ | 114 | $\gamma_1/\Delta n^2 \times 10^{-2}$ | 113 | $\gamma_1/\Delta n^2 \times 10^{-2}$ | 114 |
| 3CyCy2 | 24% | 3CyCy2 | 24% | 3CyCy2 | 24% |
| 3CyCy4 | 4% | 3CyCy4 | 4% | 3CyCy4 | 4% |
| 3CyPh5O2 | 7% | 3CyPh5O2 | 7% | 3CyPh5O2 | 7% |
| 3CyPh5O4 | 8% | 3CyPh5O4 | 8% | 3CyPh5O4 | 8% |
| 2CyPhPh5O2 | 4% | 2CyPhPh5O2 | 5% | 2CyPhPh5O2 | 6% |
| 3CyPhPh5O2 | 5% | 3CyPhPh5O2 | 6% | 3CyPhPh5O2 | 7% |
| 3CyCyPh5O3 | 8% | 3CyCyPh5O3 | 7% | 3CyCyPh5O3 | 7% |
| 4CyCyPh5O2 | 10% | 4CyCyPh5O2 | 9% | 4CyCyPh5O2 | 7% |
| 5CyCyPh5O2 | 8% | 5CyCyPh5O2 | 7% | 5CyCyPh5O2 | 7% |
| 3PhPh5Ph2 | 4% | 3PhPh5Ph2 | 4% | 3PhPh5Ph2 | 4% |
| 4PhPh5Ph2 | 4% | 4PhPh5Ph2 | 4% | 4PhPh5Ph2 | 4% |
| 5PhPh1 | 10% | 5PhPh1 | 7% | 5PhPh1 | 4% |
| 3CyCyPh1 | 4% | 3CyCyPh1 | 8% | 3CyCyPh1 | 11% |

TABLE 53

| | Comparative Example 25 | Comparative Example 26 | Comparative Example 27 | Comparative Example 28 |
|---|---|---|---|---|
| Liquid crystal composition | Comparative liquid crystal composition 7 | Comparative liquid crystal composition 7 | Comparative liquid crystal composition 7 | Comparative liquid crystal composition 7 |
| Color filter | Color filter 1 | Color filter 2 | Color filter 3 | Color filter 4 |
| VHR | 97.9 | 98.1 | 98.4 | 98.4 |
| ID | 174 | 159 | 142 | 138 |
| Image sticking | D | D | D | D |

TABLE 54

| | Comparative Example 29 | Comparative Example 30 | Comparative Example 31 | Comparative Example 32 |
|---|---|---|---|---|
| Liquid crystal composition | Comparative liquid crystal composition 8 | Comparative liquid crystal composition 8 | Comparative liquid crystal composition 8 | Comparative liquid crystal composition 8 |
| Color filter | Color filter 1 | Color filter 2 | Color filter 3 | Color filter 4 |
| VHR | 98.1 | 98.4 | 98.5 | 98.4 |
| ID | 162 | 145 | 129 | 132 |
| Image sticking | D | D | C | D |

TABLE 55

| | Comparative Example 33 | Comparative Example 34 | Comparative Example 35 | Comparative Example 36 |
|---|---|---|---|---|
| Liquid crystal composition | Comparative liquid crystal composition 9 | Comparative liquid crystal composition 9 | Comparative liquid crystal composition 9 | Comparative liquid crystal composition 9 |
| Color filter | Color filter 1 | Color filter 2 | Color filter 3 | Color filter 4 |
| VHR | 98.1 | 98.3 | 98.5 | 98.6 |
| ID | 168 | 149 | 130 | 134 |
| Image sticking | C | D | C | D |

Compared to the liquid crystal display devices of the present invention, the liquid crystal display devices of Comparative Examples 25 to 36 exhibited a low VHR and a high ID. In image sticking evaluation, retained images were observed and the level thereof was not acceptable.

Comparative Examples 37 to 48

Comparative liquid crystal compositions shown in Table 56 were held in VA cells as in Example 1. Liquid crystal display devices of Comparative Examples 37 to 48 were prepared by using the color filters 1 to 4 shown in Table 1 and the VHR and ID of the devices were measured. Image sticking evaluation was conducted on the liquid crystal display devices. The results are shown in Tables 57 to 59.

TABLE 56

| | Comparative liquid crystal composition 10 | | Comparative liquid crystal composition 11 | | Comparative liquid crystal composition 12 |
|---|---|---|---|---|---|
| $T_{NI}/°C$ | 73.6 | $T_{NI}/°C$ | 80.9 | $T_{NI}/°C$ | 84.7 |
| $\Delta n$ | 0.099 | $\Delta n$ | 0.094 | $\Delta n$ | 0.085 |
| no | 1.484 | no | 1.480 | no | 1.477 |
| $\epsilon_{//}$ | 3.21 | $\epsilon_{//}$ | 3.07 | $\epsilon_{//}$ | 3.00 |
| $\epsilon_{\perp}$ | 5.36 | $\epsilon_{\perp}$ | 5.23 | $\epsilon_{\perp}$ | 5.13 |
| $\Delta\epsilon$ | −2.15 | $\Delta\epsilon$ | −2.16 | $\Delta\epsilon$ | −2.13 |
| $\eta$/mPa·s | 17.7 | $\eta$/mPa·s | 17.0 | $\eta$/mPa·s | 17.5 |
| $\gamma_1$/mPa·s | 104 | $\gamma_1$/mPa·s | 97 | $\gamma_1$/mPa·s | 98 |
| $\gamma_1/\Delta n^2 \times 10^{-2}$ | 106 | $\gamma_1/\Delta n^2 \times 10^{-2}$ | 109 | $\gamma_1/\Delta n^2 \times 10^{-2}$ | 136 |
| 3CyCy2 | 20% | 3CyCy2 | 24% | 3CyCy2 | 21% |
| 3CyCy4 | 12% | 3CyCy4 | 12% | 3CyCy4 | 15% |
| 3CyCy5 | 7% | 3CyCy5 | 15% | 3CyCy5 | 15% |
| 3CyPhO1 | 12% | 3CyPh5O2 | 5% | 3CyPh5O2 | 5% |
| 3CyPh5O2 | 5% | 3CyPh5O4 | 5% | 3CyPh5O4 | 5% |
| 3CyPh5O4 | 5% | 2CyPhPh5O2 | 11% | 2CyPhPh5O2 | 4% |
| 2CyPhPh5O2 | 11% | 3CyPhPh5O2 | 11% | 3CyPhPh5O2 | 5% |
| 3CyPhPh5O2 | 11% | 3CyCyPh5O3 | 3% | 3CyCyPh5O3 | 7% |
| 3CyCyPh5O3 | 3% | 4CyCyPh5O2 | 3% | 4CyCyPh5O2 | 8% |
| 4CyCyPh5O2 | 3% | 5CyCyPh5O2 | 3% | 5CyCyPh5O2 | 7% |
| 5CyCyPh5O2 | 3% | 3PhPh5Ph2 | 4% | 3PhPh5Ph2 | 4% |
| 3PhPh5Ph2 | 4% | 4PhPh5Ph2 | 4% | 4PhPh5Ph2 | 4% |
| 4PhPh5Ph2 | 4% | | | | |

TABLE 57

| | Comparative Example 37 | Comparative Example 38 | Comparative Example 39 | Comparative Example 40 |
|---|---|---|---|---|
| Liquid crystal composition | Comparative liquid crystal composition 10 | Comparative liquid crystal composition 10 | Comparative liquid crystal composition 10 | Comparative liquid crystal composition 10 |
| Color filter | Color filter 1 | Color filter 2 | Color filter 3 | Color filter 4 |
| VHR | 98.0 | 98.2 | 98.5 | 98.4 |
| ID | 179 | 160 | 145 | 150 |
| Image sticking | D | D | D | D |

TABLE 58

| | Comparative Example 41 | Comparative Example 42 | Comparative Example 43 | Comparative Example 44 |
|---|---|---|---|---|
| Liquid crystal composition | Comparative liquid crystal composition 11 | Comparative liquid crystal composition 11 | Comparative liquid crystal composition 11 | Comparative liquid crystal composition 11 |
| Color filter | Color filter 1 | Color filter 2 | Color filter 3 | Color filter 4 |
| VHR | 98.1 | 98.3 | 98.5 | 98.5 |
| ID | 162 | 150 | 131 | 133 |
| Image sticking | D | D | C | D |

TABLE 59

| | Comparative Example 45 | Comparative Example 46 | Comparative Example 47 | Comparative Example 48 |
|---|---|---|---|---|
| Liquid crystal composition | Comparative liquid crystal composition 12 | Comparative liquid crystal composition 12 | Comparative liquid crystal composition 12 | Comparative liquid crystal composition 12 |
| Color filter | Color filter 1 | Color filter 2 | Color filter 3 | Color filter 4 |
| VHR | 98.0 | 98.3 | 98.4 | 98.5 |
| ID | 161 | 147 | 129 | 135 |
| Image sticking | D | D | C | D |

Compared to the liquid crystal display devices of the present invention, the liquid crystal display devices of Comparative Examples 37 to 48 exhibited a low VHR and a high ID. In image sticking evaluation, retained images were observed and the level thereof was not acceptable.

Comparative Examples 49 to 60

A comparative liquid crystal composition shown in Table 60 was held as in Example 1. Liquid crystal display devices of Comparative Examples 49 to 60 were prepared by using the color filters 1 to 4 shown in Table 1 and the VHR and ID of the devices were measured. Image sticking evaluation was conducted on the liquid crystal display devices. The results are shown in Tables 61 to 63.

TABLE 60

| | Comparative liquid crystal composition 13 | | Comparative liquid crystal composition 14 | | Comparative liquid crystal composition 15 |
|---|---|---|---|---|---|
| $T_{NI}/°C$ | 77.1 | $T_{NI}/°C$ | 80.8 | $T_{NI}/°C$ | 86.3 |
| $\Delta n$ | 0.109 | $\Delta n$ | 0.108 | $\Delta n$ | 0.107 |
| no | 1.489 | no | 1.488 | no | 1.487 |
| $\epsilon_{//}$ | 3.18 | $\epsilon_{//}$ | 3.18 | $\epsilon_{//}$ | 3.15 |
| $\epsilon_{\perp}$ | 5.29 | $\epsilon_{\perp}$ | 5.38 | $\epsilon_{\perp}$ | 5.42 |
| $\Delta\epsilon$ | −2.10 | $\Delta\epsilon$ | −2.20 | $\Delta\epsilon$ | −2.27 |
| $\eta$/mPa·s | 21.6 | $\eta$/mPa·s | 22.1 | $\eta$/mPa·s | 22.3 |
| $\gamma_1$/mPa·s | 130 | $\gamma_1$/mPa·s | 133 | $\gamma_1$/mPa·s | 134 |
| $\gamma_1/\Delta n^2 \times 10^{-2}$ | 109 | $\gamma_1/\Delta n^2 \times 10^{-2}$ | 114 | $\gamma_1/\Delta n^2 \times 10^{-2}$ | 118 |
| 3CyCy2 | 24% | 3CyCy2 | 24% | 3CyCy2 | 24% |
| 3CyCy4 | 7% | 3CyCy4 | 7% | 3CyCy4 | 7% |

TABLE 60-continued

| Comparative liquid composition 13 | | Comparative liquid crystal composition 14 | | Comparative liquid crystal composition 15 | |
|---|---|---|---|---|---|
| 3CyPhO1 | 5% | 3CyPhO1 | 5% | 3CyPhO1 | 5% |
| 2CyPh5O2 | 2% | 2CyPh5O2 | 2% | 2CyPh5O2 | 2% |
| 3CyPh5O4 | 2% | 3CyPh5O4 | 2% | 3CyPh5O4 | 2% |
| 2CyPhPh5O2 | 8% | 2CyPhPh5O2 | 8% | 2CyPhPh5O2 | 8% |
| 3CyPhPh5O2 | 8% | 3CyPhPh5O2 | 8% | 3CyPhPh5O2 | 8% |
| 3CyCyPh5O3 | 7% | 3CyCyPh5O3 | 8% | 3CyCyPh5O3 | 8% |
| 4CyCyPh5O2 | 9% | 4CyCyPh5O2 | 8% | 4CyCyPh5O2 | 8% |
| 5CyCyPh5O2 | 7% | 5CyCyPh5O2 | 8% | 5CyCyPh5O2 | 8% |
| 3PhPh5Ph2 | 4% | 3PhPh5Ph2 | 4% | 3PhPh5Ph2 | 4% |
| 4PhPh5Ph2 | 4% | 4PhPh5Ph2 | 4% | 4PhPh5Ph2 | 4% |
| 5PhPh1 | 13% | 5PhPh1 | 11% | 5PhPh1 | 8% |
|  |  | 3CyCyPh1 | 1% | 3CyCyPh1 | 4% |

TABLE 61

|  | Comparative Example 49 | Comparative Example 50 | Comparative Example 51 | Comparative Example 52 |
|---|---|---|---|---|
| Liquid crystal composition | Comparative liquid crystal composition 13 | Comparative liquid crystal composition 13 | Comparative liquid crystal composition 13 | Comparative liquid crystal composition 13 |
| Color filter | Color filter 1 | Color filter 2 | Color filter 3 | Color filter 4 |
| VHR | 98.0 | 98.2 | 98.4 | 98.5 |
| ID | 173 | 160 | 145 | 144 |
| Image sticking | D | D | D | D |

TABLE 62

|  | Comparative Example 53 | Comparative Example 54 | Comparative Example 55 | Comparative Example 56 |
|---|---|---|---|---|
| Liquid crystal composition | Comparative liquid crystal composition 14 | Comparative liquid crystal composition 14 | Comparative liquid crystal composition 14 | Comparative liquid crystal composition 14 |
| Color filter | Color filter 1 | Color filter 2 | Color filter 3 | Color filter 4 |
| VHR | 98.1 | 98.3 | 98.5 | 98.5 |
| ID | 162 | 146 | 130 | 134 |
| Image sticking | D | D | C | D |

TABLE 63

|  | Comparative Example 57 | Comparative Example 58 | Comparative Example 59 | Comparative Example 60 |
|---|---|---|---|---|
| Liquid crystal composition | Comparative liquid crystal composition 15 | Comparative liquid crystal composition 15 | Comparative liquid crystal composition 15 | Comparative liquid crystal composition 15 |
| Color filter | Color filter 1 | Color filter 2 | Color filter 3 | Color filter 4 |
| VHR | 98.2 | 98.4 | 98.5 | 98.6 |
| ID | 166 | 150 | 131 | 133 |
| Image sticking | D | D | D | C |

Compared to the liquid crystal display devices of the present invention, the liquid crystal display devices of Comparative Examples 49 to 60 exhibited a low VHR and a high ID. In image sticking evaluation, retained images were observed and the level thereof was not acceptable.

Comparative Examples 61 to 72

Comparative liquid crystal compositions shown in Table 64 were held in VA cells as in Example 1. Liquid crystal display devices of Comparative Examples 61 to 72 were prepared by using the color filters 1 to 4 shown in Table 1 and the VHR and ID of the devices were measured. Image sticking evaluation was conducted on the liquid crystal display devices. The results are shown in Tables 65 to 67.

TABLE 64

| Comparative liquid crystal composition 16 | | Comparative liquid crystal composition 17 | | Comparative liquid crystal composition 18 | |
|---|---|---|---|---|---|
| $T_{NI}/°C$ | 74.7 | $T_{NI}/°C$ | 74.7 | $T_{NI}/°C$ | 86.2 |
| $\Delta n$ | 0.104 | $\Delta n$ | 0.104 | $\Delta n$ | 0.102 |
| no | 1.483 | no | 1.483 | no | 1.480 |
| $\epsilon_{\parallel}$ | 3.38 | $\epsilon_{\parallel}$ | 3.38 | $\epsilon_{\parallel}$ | 3.23 |
| $\epsilon_{\perp}$ | 6.85 | $\epsilon_{\perp}$ | 6.85 | $\epsilon_{\perp}$ | 6.73 |
| $\Delta\epsilon$ | −3.47 | $\Delta\epsilon$ | −3.47 | $\Delta\epsilon$ | −3.50 |
| $\eta/mPa \cdot s$ | 22.9 | $\eta/mPa \cdot s$ | 22.9 | $\eta/mPa \cdot s$ | 25.3 |
| $\gamma_1/mPa \cdot s$ | 121 | $\gamma_1/mPa \cdot s$ | 121 | $\gamma_1/mPa \cdot s$ | 127 |
| $\gamma_1/\Delta n^2 \times 10^{-2}$ | 112 | $\gamma_1/\Delta n^2 \times 10^{-2}$ | 112 | $\gamma_1/\Delta n^2 \times 10^{-2}$ | 123 |
| 3CyCy2 | 12% | 3CyCy2 | 12% | 3CyCy4 | 20% |
| 3CyCy4 | 12% | 3CyCy4 | 12% | 3CyCy5 | 15% |
| 3CyCy5 | 5% | 3CyCy5 | 5% | 2CyPh5O2 | 11% |
| 3CyPhO1 | 6% | 3CyPhO1 | 6% | 3CyPh5O4 | 11% |
| 2CyPh5O2 | 11% | 2CyPh5O2 | 11% | 2CyPhPh5O2 | 7% |
| 3CyPh5O4 | 11% | 3CyPh5O4 | 11% | 3CyPhPh5O2 | 8% |
| 2CyPhPh5O2 | 7% | 2CyPhPh5O2 | 7% | 3CyCyPh5O3 | 5% |
| 3CyPhPh5O2 | 8% | 3CyPhPh5O2 | 8% | 4CyCyPh5O2 | 5% |
| 3CyCyPh5O3 | 5% | 3CyCyPh5O3 | 5% | 5CyCyPh5O2 | 5% |

TABLE 64-continued

| Comparative liquid crystal composition 16 | | Comparative liquid crystal composition 17 | | Comparative liquid crystal composition 18 | |
|---|---|---|---|---|---|
| 4CyCyPh5O2 | 5% | 4CyCyPh5O2 | 5% | 3PhPh5Ph2 | 4% |
| 5CyCyPh5O2 | 5% | 5CyCyPh5O2 | 5% | 4PhPh5Ph2 | 4% |
| 3PhPh5Ph2 | 5% | 3PhPh5Ph2 | 5% | 3CyCyPh1 | 5% |
| 4PhPh5Ph2 | 5% | 4PhPh5Ph2 | 5% | | |
| 3CyCyPh1 | 3% | 3CyCyPh1 | 3% | | |

TABLE 65

| | Comparative Example 61 | Comparative Example 62 | Comparative Example 63 | Comparative Example 64 |
|---|---|---|---|---|
| Liquid crystal composition | Comparative liquid crystal composition 16 | Comparative liquid crystal composition 16 | Comparative liquid crystal composition 16 | Comparative liquid crystal composition 16 |
| Color filter | Color filter 1 | Color filter 2 | Color filter 3 | Color filter 4 |
| VHR | 97.9 | 98.2 | 98.3 | 98.4 |
| ID | 175 | 163 | 144 | 142 |
| Image sticking | D | D | D | D |

TABLE 66

| | Comparative Example 65 | Comparative Example 66 | Comparative Example 67 | Comparative Example 68 |
|---|---|---|---|---|
| Liquid crystal composition | Comparative liquid crystal composition 17 | Comparative liquid crystal composition 17 | Comparative liquid crystal composition 17 | Comparative liquid crystal composition 17 |
| Color filter | Color filter 1 | Color filter 2 | Color filter 3 | Color filter 4 |
| VHR | 98.0 | 98.2 | 98.5 | 98.5 |
| ID | 161 | 145 | 130 | 134 |
| Image sticking | D | D | C | D |

TABLE 67

| | Comparative Example 69 | Comparative Example 70 | Comparative Example 71 | Comparative Example 72 |
|---|---|---|---|---|
| Liquid crystal composition | Comparative liquid crystal composition 18 | Comparative liquid crystal composition 18 | Comparative liquid crystal composition 18 | Comparative liquid crystal composition 18 |
| Color filter | Color filter 1 | Color filter 2 | Color filter 3 | Color filter 4 |
| VHR | 98.1 | 98.4 | 98.4 | 98.5 |
| ID | 162 | 139 | 130 | 136 |
| Image sticking | D | D | D | D |

Compared to the liquid crystal display devices of the present invention, the liquid crystal display devices of Comparative Examples 61 to 72 exhibited a low VHR and a high ID. In image sticking evaluation, retained images were observed and the level thereof was not acceptable.

Comparative Examples 73 to 84

Comparative liquid crystal compositions shown in Table 68 were held in VA cells as in Example 1. Liquid crystal display devices of Comparative Examples 73 to 84 were prepared by using the color filters 1 to 4 shown in Table 1 and the VHR and ID of the devices were measured. Image sticking evaluation was conducted on the liquid crystal display devices. The results are shown in Tables 69 to 71.

TABLE 68

| Comparative liquid crystal composition 19 | | Comparative liquid crystal composition 20 | | Comparative liquid crystal composition 21 | |
|---|---|---|---|---|---|
| $T_{NI}/°C.$ | 74.9 | $T_{NI}/°C.$ | 79.6 | $T_{NI}/°C.$ | 85.4 |
| $\Delta n$ | 0.103 | $\Delta n$ | 0.104 | $\Delta n$ | 0.107 |
| no | 1.484 | no | 1.484 | no | 1.485 |
| $\epsilon_\parallel$ | 3.18 | $\epsilon_\parallel$ | 3.14 | $\epsilon_\parallel$ | 3.11 |
| $\epsilon_\perp$ | 5.52 | $\epsilon_\perp$ | 5.53 | $\epsilon_\perp$ | 5.56 |
| $\Delta\epsilon$ | -2.34 | $\Delta\epsilon$ | -2.39 | $\Delta\epsilon$ | -2.46 |
| $\eta/mPa \cdot s$ | 18.4 | $\eta/mPa \cdot s$ | 18.9 | $\eta/mPa \cdot s$ | 20.0 |
| $\gamma_1/mPa \cdot s$ | 106 | $\gamma_1/mPa \cdot s$ | 108 | $\gamma_1/mPa \cdot s$ | 114 |
| $\gamma_1/\Delta n^2 \times 10^{-2}$ | 99 | $\gamma_1/\Delta n^2 \times 10^{-2}$ | 99 | $\gamma_1/\Delta n^2 \times 10^{-2}$ | 99 |
| 3CyCy2 | 20% | 3CyCy2 | 20% | 3CyCy2 | 18% |
| 3CyCy4 | 12% | 3CyCy4 | 12% | 3CyCy4 | 12% |
| 3CyCy5 | 5% | 3CyCy5 | 5% | 3CyCy5 | 5% |
| 3CyPhO1 | 5% | 3CyPhO1 | 2% | 2CyPh5O2 | 7% |
| 2CyPh5O2 | 7% | 2CyPh5O2 | 7% | 3CyPh5O4 | 8% |
| 3CyPh5O4 | 8% | 3CyPh5O4 | 8% | 2CyPhPh5O2 | 6% |
| 2CyPhPh5O2 | 6% | 2CyPhPh5O2 | 6% | 3CyPhPh5O2 | 6% |
| 3CyPhPh5O2 | 6% | 3CyPhPh5O2 | 6% | 3CyCyPh5O3 | 4% |
| 3CyCyPh5O3 | 4% | 3CyCyPh5O3 | 4% | 4CyCyPh5O2 | 4% |
| 4CyCyPh5O2 | 4% | 4CyCyPh5O2 | 4% | 5CyCyPh5O2 | 4% |
| 5CyCyPh5O2 | 4% | 5CyCyPh5O2 | 4% | 3PhPh5Ph2 | 7% |
| 3PhPh5Ph2 | 7% | 3PhPh5Ph2 | 7% | 4PhPh5Ph2 | 8% |
| 4PhPh5Ph2 | 8% | 4PhPh5Ph2 | 8% | 3CyCyPh1 | 11% |
| 3CyCyPh1 | 4% | 3CyCyPh1 | 7% | | |

TABLE 69

| | Comparative Example 73 | Comparative Example 74 | Comparative Example 75 | Comparative Example 76 |
|---|---|---|---|---|
| Liquid crystal composition | Comparative liquid crystal composition 19 | Comparative liquid crystal composition 19 | Comparative liquid crystal composition 19 | Comparative liquid crystal composition 19 |
| Color filter | Color filter 1 | Color filter 2 | Color filter 3 | Color filter 4 |
| VHR | 97.9 | 98.2 | 98.3 | 98.4 |
| ID | 170 | 158 | 146 | 148 |
| Image sticking | D | D | D | D |

TABLE 70

| | Comparative Example 77 | Comparative Example 78 | Comparative Example 79 | Comparative Example 80 |
|---|---|---|---|---|
| Liquid crystal composition | Comparative liquid crystal composition 20 | Comparative liquid crystal composition 20 | Comparative liquid crystal composition 20 | Comparative liquid crystal composition 20 |
| Color filter | Color filter 1 | Color filter 2 | Color filter 3 | Color filter 4 |
| VHR | 98.1 | 98.3 | 98.4 | 98.5 |
| ID | 165 | 142 | 132 | 136 |
| Image sticking | D | D | D | C |

TABLE 71

| | Comparative Example 81 | Comparative Example 82 | Comparative Example 83 | Comparative Example 84 |
|---|---|---|---|---|
| Liquid crystal composition | Comparative liquid crystal composition 21 | Comparative liquid crystal composition 21 | Comparative liquid crystal composition 21 | Comparative liquid crystal composition 21 |
| Color filter | Color filter 1 | Color filter 2 | Color filter 3 | Color filter 4 |
| VHR | 98.1 | 98.3 | 98.5 | 98.4 |
| ID | 161 | 145 | 132 | 135 |
| Image sticking | D | D | C | D |

Compared to the liquid crystal display devices of the present invention, the liquid crystal display devices of Comparative Examples 73 to 84 exhibited a low VHR and a high ID. In image sticking evaluation, retained images were observed and the level thereof was not acceptable.

Comparative Examples 85 to 88

A comparative liquid crystal composition shown in Table 72 was held in a VA cell as in Example 1. Liquid crystal display devices of Comparative Examples 85 to 88 were prepared by using the color filters 1 to 4 shown in Table 1 and the VHR and ID of the devices were measured. Image sticking evaluation was conducted on the liquid crystal display devices. The results are shown in Table 73.

TABLE 72

| Comparative liquid crystal composition 22 | |
|---|---|
| $T_{NI}/°C.$ | 86.3 |
| $\Delta n$ | 0.105 |
| $n_o$ | 1.486 |
| $\epsilon_\parallel$ | 3.44 |
| $\epsilon_\perp$ | 6.86 |
| $\Delta\epsilon$ | −3.41 |
| $\eta$/mPa·s | 26.4 |
| $\gamma_1$/mPa·s | 149 |
| $\gamma_1/\Delta n^2 \times 10^{-2}$ | 135 |
| 3CyCy2 | 24% |

TABLE 72-continued

| Comparative liquid crystal composition 22 | |
|---|---|
| 3CyPhO1 | 11% |
| 2CyPh5O2 | 10% |
| 2CyPhPh5O2 | 7% |
| 3CyPhPh5O2 | 9% |
| 3CyCyPh5O3 | 10% |
| 4CyCyPh5O2 | 10% |
| 5CyCyPh5O2 | 10% |
| 3PhPh5Ph2 | 4% |
| 4PhPh5Ph2 | 4% |
| 5PhPh1 | 1% |

TABLE 73

| | Comparative Example 85 | Comparative Example 86 | Comparative Example 87 | Comparative Example 88 |
|---|---|---|---|---|
| Liquid crystal composition | Comparative liquid crystal composition 22 | Comparative liquid crystal composition 22 | Comparative liquid crystal composition 22 | Comparative liquid crystal composition 22 |
| Color filter | Color filter 1 | Color filter 2 | Color filter 3 | Color filter 4 |
| VHR | 97.9 | 98.2 | 98.4 | 98.5 |
| ID | 173 | 152 | 145 | 146 |
| Image sticking | D | D | D | D |

Compared to the liquid crystal display devices of the present invention, the liquid crystal display devices of Comparative Examples 85 to 88 exhibited a low VHR and a high ID. In image sticking evaluation, retained images were observed and the level thereof was not acceptable.

Comparative Examples 89 to 96

The liquid crystal compositions 1, 2, 8, 13, 14, 19, 20, and 26 were each held in the VA cell used in Example 1. Liquid crystal display devices of Comparative Examples 89 to 96 were prepared by using the comparative color filter 1 shown in Table 1 and the VHR and ID of the devices were measured. Image sticking evaluation was conducted on the liquid crystal display devices. The results are shown in Tables 74 and 75.

TABLE 74

| | Comparative Example 89 | Comparative Example 90 | Comparative Example 91 | Comparative Example 92 |
|---|---|---|---|---|
| Liquid crystal composition | Liquid crystal composition 1 | Liquid crystal composition 2 | Liquid crystal composition 8 | Liquid crystal composition 13 |
| Color filter | Comparative color filter 1 | Comparative color filter 1 | Comparative color filter 1 | Comparative color filter 1 |
| VHR | 97.8 | 98.0 | 98.1 | 98.2 |
| ID | 185 | 174 | 189 | 177 |
| Image sticking | D | D | D | D |

TABLE 75

| | Comparative Example 93 | Comparative Example 94 | Comparative Example 95 | Comparative Example 96 |
|---|---|---|---|---|
| Liquid crystal composition | Liquid crystal composition 14 | Liquid crystal composition 19 | Liquid crystal composition 20 | Liquid crystal composition 26 |
| Color filter | Comparative color filter 1 | Comparative color filter 1 | Comparative color filter 1 | Comparative color filter 1 |
| VHR | 97.9 | 98.1 | 98.3 | 98.3 |

TABLE 75-continued

|  | Comparative Example 93 | Comparative Example 94 | Comparative Example 95 | Comparative Example 96 |
|---|---|---|---|---|
| ID | 180 | 173 | 169 | 166 |
| Image sticking | D | D | D | D |

Compared to the liquid crystal display devices of the present invention, the liquid crystal display devices of Comparative Examples 89 to 96 exhibited a low VHR and a high ID. In image sticking evaluation, retained images were observed and the level thereof was not acceptable.

The invention claimed is:

1. A liquid crystal display device comprising a first substrate, a second substrate, a liquid crystal composition layer held between the first substrate and the second substrate, a color filter that includes a black matrix and at least RGB three-color pixel portions, a pixel electrode, and a common electrode, the liquid crystal composition layer being constituted by a liquid crystal composition containing 30 to 50% of a compound represented by general formula (I)

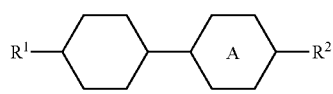

(in general formula (I), $R^1$ and $R^2$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms and A represents a 1,4-phenylene group or a trans-1,4-cyclohexylene group), 5 to 20% of a compound represented by general formula (II-1)

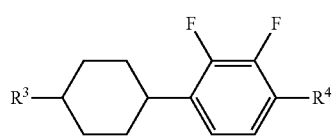

(in general formula (II-1), $R^3$ represents an alkyl group having 1 to 8 carbon atoms, an alkenyl group having 2 to 8 carbon atoms, an alkoxy group having 1 to 8carbon atoms, or an alkenyloxy group having 2 to 8 carbon atoms and $R^4$ represents an alkyl group having 1 to 8 carbon atoms, an alkenyl group having 4 to 8 carbon atoms, an alkoxy group having 1 to 8 carbon atoms, or an alkenyloxy group having 3 to 8 carbon atoms), 25 to 45% of a compound represented by general formula (II-2)

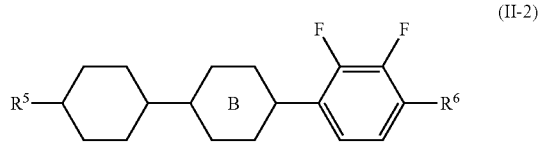

(in general formula (II-2), $R^5$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, $R^6$ represents an alkyl group having 1 to 8 carbon atoms, an alkenyl group having 4 to 8 carbon atoms, an alkoxy group having 1 to 8 carbon atoms, or an alkenyloxy group having 3 to 8 carbon atoms, and B represents a trans-1,4-cyclohexylene group or a 1,4-phenylene group which may be substituted with fluorine), and 5 to 20% of a compound represented by general formula (III)

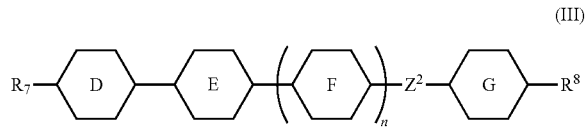

(in general formula (III), $R^7$ and $R^8$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; D, E, F, and G each independently represent trans-1,4-cyclohexylene or a 1,4-phenylene group which may be substituted with fluorine; $Z^2$ represents a single bond, —OCH$_2$—, —OCO—, —CH$_2$O—, or —COO—; n represents 0 or 1;

and when n represents 0, $Z^2$ represents —OCH$_2$—, —OCO—, —CH$_2$O—, or —COO— or D, E and G each represent a 1,4-phenylene group which may be substituted with fluorine), wherein a G pixel portion of the RGB three-color pixel portions contains, as a coloring material, a halogenated metal phthalocyanine pigment that contains, as a central metal, a metal selected from the group consisting of Al, Si, Sc, Ti, V, Mg, Fe, Co, Ni, Zn, Ga, Ge, Y, Zr, Nb, In, Sn, and Pb, where when the central metal is trivalent, the central metal is bonded to one halogen atom, hydroxyl group, or sulfonic acid group or is oxo- or thio-bridged and when the central metal is a tetravalent metal, the central metal is bonded to one oxygen atom or two selected from a halogen atom, a hydroxyl group, and a sulfonic acid group, the selected two being the same or different from each other.

2. The liquid crystal display device according to claim 1, wherein, of the RGB three-color pixel portions, a R pixel portion contains, as a coloring material, a diketopyrrolopyrrole pigment and/or an anionic red organic dye and a B pixel portion contains, as a coloring material, an ∈-type copper phthalocyanine pigment and/or a cationic blue organic dye.

3. The liquid crystal display device according to claim 1, wherein, of the RGB three-color pixel portions, a R pixel portion contains, as a coloring material, C.I. Solvent Red 124 and a B pixel portion contains, as a coloring material, C.I. Solvent Blue 7.

4. The liquid crystal display device according to claim 1, wherein, of the RGB three-color pixel portions, a R pixel portion contains, as a coloring material, C.I. Pigment Red 254 and a B pixel portion contains, as a coloring material, C.I. Pigment Blue 15:6.

5. The liquid crystal display device according to claim 1, wherein the G pixel portion contains a halogenated zinc phthalocyanine pigment containing Zn as a central metal and eight to sixteen halogen atoms bonded to benzene rings of a phthalocyanine molecule per phthalocyanine molecule.

6. The liquid crystal display device according to claim 1, wherein the G pixel portion contains C.I. Pigment Green 58.

7. The liquid crystal display device according to claim 1, wherein the G pixel portion further contains at least one organic dye or pigment selected from the group consisting of C.I. Pigment Yellow 150, 215, 185, and 138, and C.I. Solvent Yellow 21, 82, 83:1, and 33.

8. The liquid crystal display device according to claim 1, wherein the color filter includes the black matrix, the RGB three-color pixel portions, and a Y pixel portion and the Y pixel portion contains, as a coloring material, at least one yellow organic dye or pigment selected from the group consisting of C.I. Pigment Yellow 150, 215, 185, 138, and 139, and C.I. Solvent Yellow 21, 82, 83:1, 33, and 162.

9. The liquid crystal display device according to claim 1, wherein at least one compound represented by general formula (I) with A representing a 1,4-phenylene group and at least one compound represented by general formula (I) with A representing a trans-1,4-cyclohexylene group are contained.

10. The liquid crystal display device according to claim 1, wherein at least one compound represented by general formula (II-2) with B representing a 1,4-phenylene group and at least one compound represented by general formula (II-2) with B representing a trans-1,4-cyclohexylene group are contained.

11. The liquid crystal display device according to Claim 1, wherein the content of the compounds represented by general formulae (II-1), (II-2), and (III) is 35% to 70%.

12. The liquid crystal display device according to claim 1, wherein the liquid crystal composition constituting the liquid crystal composition layer has a Z value, which is expressed by equation [Math. 1] below, of 13000 or less, γ1 is 150 or less, and Δn is in the range of 0.08 to 0.13:

$$Z = \gamma 1/\Delta n^2 \qquad \text{[Math. 1]}$$

(where γ1 represents a rotational viscosity and Δn represents a refractive index anisotropy).

13. The liquid crystal display device according to claim 1, wherein the liquid crystal composition constituting the liquid crystal composition layer has a nematic liquid crystal phase upper limit temperature of 60° C. to 120° C., a nematic liquid crystal phase lower limit temperature of −20° C. or lower, and a difference of 100 to 150 between the nematic liquid crystal phase upper limit temperature and lower limit temperature.

14. The liquid crystal display device according to claim 1, wherein the liquid crystal composition constituting the liquid crystal composition layer has a specific resistance of $10^{12}$ (Ω·m) or more.

15. The liquid crystal display device according to claim 1, wherein the liquid crystal composition layer is composed of a polymer obtained by polymerizing a liquid crystal composition that contains a polymerizable compound represented by general formula (V)

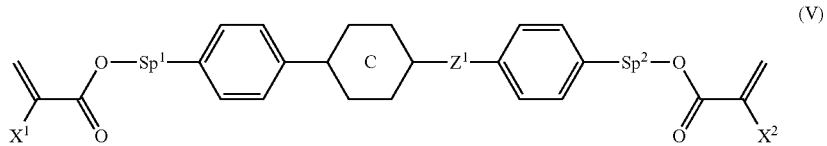

(V)

(in general formula (V), $X^1$ and $X^2$ each independently represent a hydrogen atom or a methyl group; $Sp^1$ and $Sp^2$ each independently represent a single bond, an alkylene group having 1 to 8 carbon atoms, or —O—$(CH_2)_s$— (where s represents an integer of 2 to 7 and the oxygen atom is to bond to an aromatic ring); $Z^1$ represents —OCH$_2$—, —CH$_2$O—, —COO—, —OCO—, —CF$_2$O—, —OCF$_2$—, —CH$_2$CH$_2$—, —CF$_2$CF$_2$—, —CH═CH—COO—, —CH═CH—OCO—, —COO—CH═CH—, —OCO—CH═CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CY$^1$═CY$^2$— (where $Y^1$ and $Y^2$ each independently represent a fluorine atom or a hydrogen atom), —C≡C—, or a single bond; and C represents a 1,4-phenylene group, a trans-1,4-cyclohexylene group, or a single bond wherein all 1,4-phenylene groups in the formula may each have any hydrogen atom substituted with a fluorine atom).

16. The liquid crystal display device according to claim 15, wherein, in general formula (V), C represents a single bond and $Z^1$ represents a single bond.

* * * * *